United States Patent
Zhang et al.

(10) Patent No.: US 11,296,956 B2
(45) Date of Patent: Apr. 5, 2022

(54) OVERSUBSCRIBABLE RESOURCE ALLOCATION

(71) Applicant: Intel Corporation, Santa Clara, CA (US)

(72) Inventors: Fan Zhang, Limerick (IE); Roger Keith Wiles, Hickory Creek, TX (US); Xin Zeng, Shanghai (CN); Cunming Liang, Shanghai (CN); Namakkal N. Venkatesan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/978,826

(22) PCT Filed: Jun. 26, 2018

(86) PCT No.: PCT/CN2018/092840
§ 371 (c)(1),
(2) Date: Sep. 8, 2020

(87) PCT Pub. No.: WO2020/000175
PCT Pub. Date: Jan. 2, 2020

(65) Prior Publication Data
US 2021/0044503 A1 Feb. 11, 2021

(51) Int. Cl.
*H04L 12/24* (2006.01)
*H04L 12/14* (2006.01)
*H04L 12/28* (2006.01)
*H04L 29/08* (2006.01)
*H04L 41/5051* (2022.01)
*H04L 41/5009* (2022.01)
*H04L 41/5025* (2022.01)
*H04L 67/1074* (2022.01)

(52) U.S. Cl.
CPC ...... *H04L 41/5051* (2013.01); *H04L 12/1432* (2013.01); *H04L 12/2876* (2013.01); *H04L 41/5009* (2013.01); *H04L 41/5025* (2013.01); *H04L 67/1078* (2013.01)

(58) Field of Classification Search
CPC ............ H04L 41/5051; H04L 41/5009; H04L 41/5025; H04L 12/1432; H04L 12/2876; H04L 67/1078
See application file for complete search history.

(56) References Cited

U.S. PATENT DOCUMENTS

| | | |
|---|---|---|
| 2013/0019277 A1 | 1/2013 | Chang et al. |
| 2013/0297673 A1 | 11/2013 | McGrath et al. |
| 2014/0358620 A1* | 12/2014 | Krebs ................ G06F 9/5072 705/7.25 |
| 2015/0058580 A1* | 2/2015 | Lagar Cavilla ....... G06F 3/0683 711/149 |

FOREIGN PATENT DOCUMENTS

| | | |
|---|---|---|
| CN | 103020205 A | 4/2013 |
| CN | 111903109 A | 11/2020 |
| WO | 2020000175 A1 | 1/2020 |

OTHER PUBLICATIONS

International Search Report and Written Opinion in International Application No. PCT/CN2018/092840 dated Mar. 4, 2019, 10 pages.

* cited by examiner

*Primary Examiner* — Brian Whipple
(74) *Attorney, Agent, or Firm* — Patent Capital Group

(57) ABSTRACT

There is disclosed in one example a computing apparatus, including: a hardware platform configured to communicatively couple with a multi-tenant cloud service, the multi-tenant cloud service including an oversubscribable resource; and a service assurance for oversubscribable resource (SAOR) engine configured to: receive tenant subscriptions to the oversubscribable resource, wherein tenant subscriptions exceed available instances of the oversubscribable resource; receive per-tenant quality of service (QoS) metrics for the oversubscribable resource; receive an allocation request from a guest for allocation of an instance of the oversubscribable resource; compare the request to currently-available instances of the oversubscribable resource; determine that the oversubscribable resource has capacity to service the request according to the QoS metrics of the tenant; and allocate an instance of the oversubscribable resource to the guest.

20 Claims, 14 Drawing Sheets

OVERSUBSCRIBABLE RESOURCE ALLOCATION

This application is a national stage application under 35 U.S.C. § 371 of PCT International Application Serial No. PCT/CN2018/092840, filed on Jun. 26, 2018 and entitled "OVERSUBSCRIBABLE RESOURCE ALLOCATION", which application is considered part of and is hereby incorporated by reference in its entirety in the disclosure of this application.

FIELD OF THE SPECIFICATION

This disclosure relates in general to the field of computing, and more particularly, though not exclusively, to a system and method for providing oversubscribable resource allocation.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
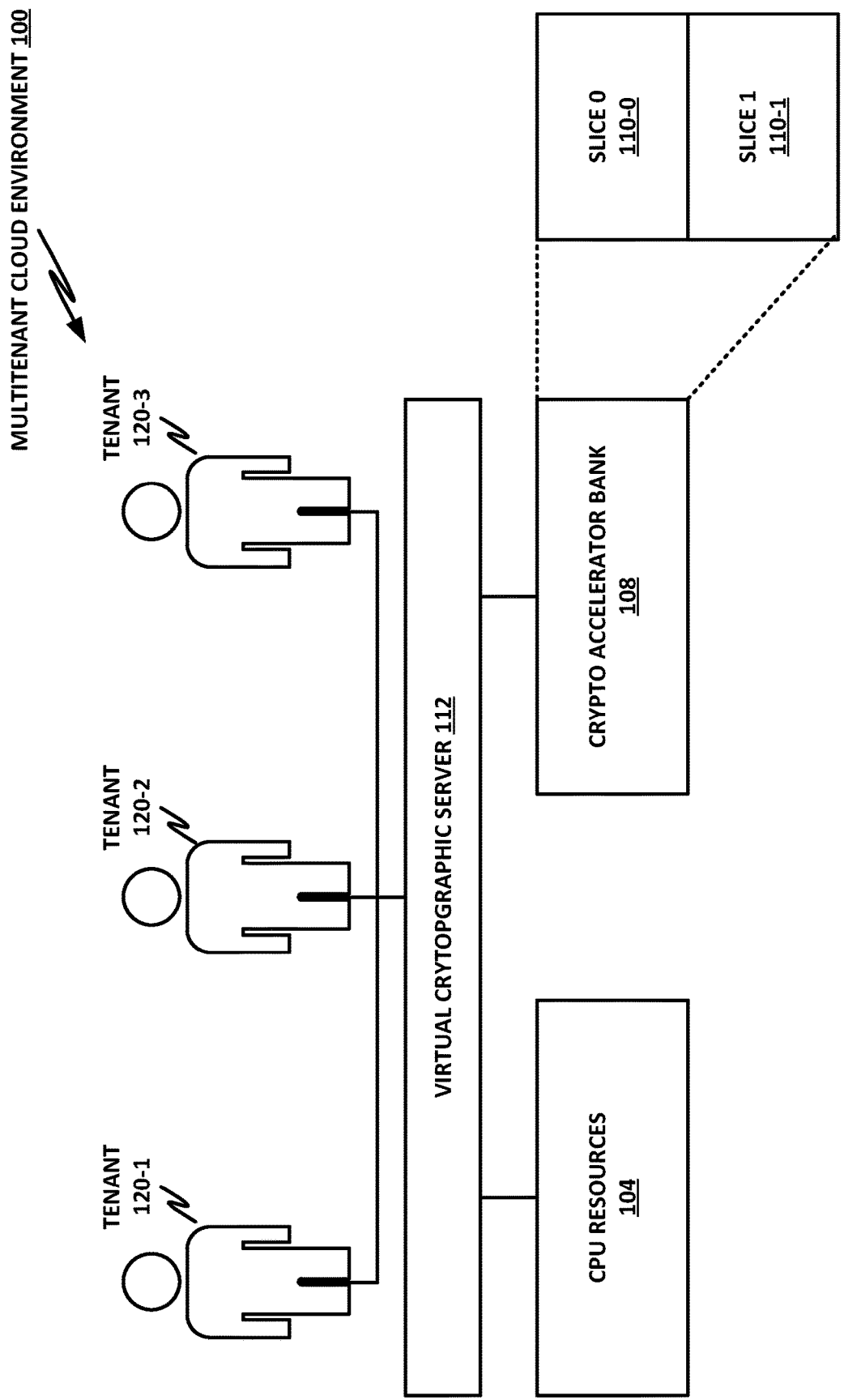
FIG. 1 is a block diagram of a multi-tenant cloud environment, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources.

By way of nonlimiting example, as used in the present specification, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), advanced reduced instruction set computer (RISC) machine (ARM) processors, or IBM PowerPC and Power instruction set architecture (ISA) processors, to name just a few.

As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer.

As used in the present specification, a VM is an isolated partition within a computing device that allows usage of an operating system and other applications, independent of other programs on the device in which it is contained. VMs, containers, and similar may be generically referred to as "guest" systems.

Containerization is a method of providing system resources wherein instances of network functions are provided in "containers" that are separated from one another, but that share underlying operating system, memory, and driver resources.

Embodiments of the present specification provide for hardware or software accelerators dedicated to certain tasks within a computing system, such as graphics or other resource-intensive applications, which help to improve overall system performance. Accelerators can provide substantial performance improvements in servers, including in standalone servers and in large data centers. For example, a cryptographic accelerator such as the Intel® QuickAssist Technology (QAT) adapter can perform preprocessing on network packets before they hit the software stack. The preprocessing may include, for example, encryption, decryption, compression, decompression, or other preprocessing. Accelerators often provide services that would otherwise be memory and/or processor intensive. Because the accelerator performs this service in hardware, it frees up processor cycles for performing other work.

In a data center, such as one provided by a CSP, a rackmount server may be communicatively coupled to a bank of accelerators via an appropriate fabric such as a peripheral component interconnect express (PCIe) fabric, or other host fabric interface.

In the data center, tenants may contract for the provision of accelerators as a subscribable service. A tenant includes any discrete workload that requires secure and exclusive access to resources within the data center. In a multi-tenant data center, design considerations may include ensuring tenant privacy and security (e.g., ensuring that neither the CSP nor other tenants can see the data owned by a tenant), service level agreements (SLAs), quality of service (QoS) metrics, and resource allocation. For example, a critically oversubscribed resource may not be able to provide to its tenants with contractual SLAs, while critically under-subscribed resources sit idle and are not monetized.

Because individual accelerators may have a much larger capacity than an individual tenant consumes at one time, a hardware accelerator card need not necessarily be provisioned and dedicated to a single tenant. Rather, an accelerator card may be "sliced" such that a plurality of tenants can access slices of resources on a single accelerator card. A tenant may subscribe for a dedicated accelerator (e.g., a single PCIe card with one or more accelerator field-programmable gate arrays on it), or for some subdivision thereof, such as a "slice" of an accelerator card. A slice can be a spatially multiplexed division of the accelerator (e.g., certain portions of the hardware are allocated to a particular tenant). In other embodiments, slicing could be accomplished via temporal multiplexing, in which all or part of the resources on an accelerator are allocated to a particular tenant at particular times.

Because not every tenant is going to require its full, guaranteed resource capacity at any given time, a data center may oversubscribe certain resources such that the available number of actual resources is less than the theoretical guaranteed resource allocation for each tenant. To ensure that each tenant receives its guaranteed resource allocation, the service provider may have an SLA with terms that ensure a tenant's computing needs are met even when the data center is oversubscribed.

Some existing embodiments of oversubscribed accelerator services in data centers may lack proper service assurance in a multi-tenant cloud environment. A service assurance may contractually ensure that services provided meet a service quality level for the contracting tenant. If the CSP cannot provide such assurance, then it may not be able to oversubscribe resources, thus leading to inefficiencies such as resources being allocated to tenants that do not presently need those resources, so that the resources sit idle.

Multi-tenant public cloud services are seeing increasing demand for accelerated services such as cryptographic acceleration, to secure their applications such as full-site hyper text transfer protocol with secure sockets layer (HTTPS) protection. To provide reduced latency to their own end users, the tenants of these cloud services do not want to use processor time to encrypt and decrypt packets, but instead prefer to have encryption and decryption take place on a dedicated accelerator. CSPs may have various pricing models such as consumption-based pricing or subscription-based pricing.

Tenants may use the crypto service application program interface (API), provided by the CSP, to process their cryptographic workloads. The workloads may then be accumulatively processed in the host. The CSP may optionally use central processing unit (CPU) or crypto accelerator hardware such as Intel® QuickAssist Technology, field-programmable gate arrays (FPGAs), application-specific integrated circuits (ASICs), digital signal processor (DSP), graphics processing unit (GPU), or similar to process the actual crypto workload sent by the tenants. But for crypto operations in which the CPU is not as efficient as a crypto accelerator, use of the accelerator is more flexible and easier to manage. Crypto accelerators may be several times more efficient in performing cryptographic operations than a CPU, and may provide more throughput than the CPU in processing asymmetric cryptographic workloads.

Thus, it is advantageous for the CSP to optimize its own allocation of accelerators. If the accelerator architecture lacks the flexibility and extensibility to ensure service assurance for each tenant at each pricing model, then data center inefficiencies may result. While it is possible to dedicate a single cryptographic accelerator or slice of a cryptographic accelerator to a single tenant, as discussed above, this may result in inefficiency when that tenant is not currently using the accelerator, and the accelerator is sitting idle while other tenants could benefit from the accelerator. This increases the CSP's costs, reduces its flexibility in providing pricing models, and may be considered as a waste of hardware resources.

It is advantageous, therefore, to provide a system and method to slice the CSP's physical crypto accelerator resources precisely and flexibly, so that each subscriber can receive the benefits of crypto resources exactly according to their pricing plans, with an allocation model that enables oversubscription while still meeting SLAs.

This method achieves benefits over existing data centers, wherein the crypto accelerator hardware's single root input/output virtualization (SR-IOV) virtual function (VF) pass-through capability exposes virtual hardware to the guests. While this solution has the advantage of high throughput, as the memory is directly mapped to the guests, it lacks flexibility to provide oversubscription.

For SR-IOV solutions, tenants are dealing with real hardware in their guests, and thus are provided with high throughput. However, the disadvantages of real-world hardware are inherited. The various APIs of different crypto accelerators may force the tenants to update drivers or applications to comply with host hardware changes. Guests may also not be able to have a crypto resource beyond the underlying accelerator. The extra resource may need to be powered by VFs provided by additional hardware, along with the tenant's application modification to comply with changes. Furthermore, the number of guests that are able to share the host's crypto accelerator is limited by the maximum VF number supported by the accelerator. Finally, some cryptographic accelerator hardware does not support rate limit capability, resulting in guests competing for the same crypto accelerator resources, which results in invalidating service assurances and compromise of SLAs. Even if each VF can be configured with a throughput rate, the SR-IOV solution lacks a unified method to enable service assurance for each guest with flexible configuration to meet different pricing plans.

Alternative systems include the virtio-crypto device, which exposes the cryptography capabilities to guests through one set of operable interfaces. The virtio-crypto standard specifies that crypto operation requests are exchanged from the guests to the host via virtio-crypto frontend (FE) and backend (BE) drivers. The host may interpret these requests sent by the guests, and either process them using software libraries or offload them to dedicated crypto hardware accelerators like QAT with a virtual host (vhost) user backend driver. Once a request is processed, the host may update the response and notify the guest of the completion. The virtio-crypto solution has lower performance than the SR-IOV solution because of the extra costs of exchanging data between the host and the guests, and exchanging data between the kernel space and the user space. However, it provides greater flexibility than the SR-IOV solution, as the number of guests assuring the physical crypto resource is limited by the system's capacity rather than the number of VFs. Furthermore, implementation details in the host are hidden from guests, so that a guest does not have to update the driver and application code in response to a hardware change. However, known embodiments of virtio-crypto do not consider quality of service (QoS) in the device. Even where QoS is considered upstream, the committed service request may be out of scope of the single virtio-crypto device.

Both SR-IOV and virtio-crypto provide means for guests to share the crypto resources in the host, thus providing cloud computing service providers the ability to sell virtual cryptographic services to their subscribers. One feature of the host's physical resource sharing between guests is the ability to slice the physical hardware for individual guests to suit their needs. This requires the system to provide the QoS for the service provider. But neither SR-IOV nor virtio-crypto provide service assurance for the guests, and the hardware cannot be sliced properly, so that the service provider cannot provide an SLA guarantee to subscribers. This can make shared crypto services and some multi-tenant cloud environments impractical.

Thus, the present specification provides a service assurance for oversubscribable resource (SAOR) engine. The SAOR engine provides a flexible and efficient slicing capability for the CSP scripter resources, along with QoS scheduling for guests. This enables the CSP to oversubscribe its accelerator resources (such as cryptographic resources) for more tenants. Furthermore, to maximize the performance for tenants who want to own one or more dedicated crypto accelerators, the SAOR engine provides a dedicated offloading support option to achieve true one-to-one mapping so that tenants who wish to pay for the extra capability can achieve a zero-copy approach (for example, a direct memory access (DMA) buffer to and from guests, directly) to reduce their overhead.

The SAOR engine of the present specification enables dedicated, customizable hardware acceleration to offload some high-cost CPU computing, thus essentially providing acceleration as a service (AaaS).

Throughout this specification, a crypto accelerator such as Intel® QuickAssist Technology (QAT) is used as a concrete example of an oversubscribable accelerator resource or service in a data center. However, it should be understood that the teaching of this specification and the scope of the appended claims is not so limited. The AaaS concept broadly encompasses any accelerator, which can be beneficially provided for any predictable operation that can be processor intense, and is suitable for offloading to an assistive device, which may include hardware or a coprocessor.

The SAOR engine of the present specification provides the infrastructure to elevate AaaS as a viable, subscribable resource in the data center. The SAOR engine of the present specification also advantageously defines a charge unit definition, so that acceleration SLAs and associated methods to support oversubscribing may be provided as a business model. This enables the efficient monetization of AaaS in the data center.

A system and method for providing oversubscribable resource allocation will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a multi-tenant cloud environment 100, according to one or more examples of the present specification.

In the example of FIG. 1, a plurality of tenants, namely tenant 120-1, tenant 120-2, and tenant 120-3, access a virtual cryptographic server 112. Virtual cryptographic server 112 may have access to CPU resources 104, and a crypto accelerator bank 108. A CSP operating data center 100 may wish to provide cryptographic services to tenants 120 on a contractual basis, which may include SLAs. However, the CSP may wish to oversubscribe crypto accelerator bank 108 to ensure that cryptographic accelerators do not sit idle while some tenants do not use them.

To provide a simplified example, crypto accelerator bank 108 may include a cryptographic accelerator that is divided into two slices, namely slice 0 110-0 and slice 1 110-1. For simplicity of the example, it may be assumed that slices 110 have identical throughput and bandwidth. Each tenant 120 may have an SLA including, for example, a guarantee of access to a certain quantum of accelerator resources. The quantum unit of accelerator access can vary depending on the SLA. For example, tenant 120-1 may require a dedicated hardware accelerator resource. Thus, the CSP may allocate slice 0 110-0 as a dedicated resource to tenant 120-1. Slice 0 110-0 may be mapped to a composite node operated by tenant 120-1, with dedicated resources such as SR-IOV and/or DMA. In some examples, tenant 120-1 may be charged relatively more for guaranteed "always on" access to dedicated slice 110-0.

Tenants 120-2 and 120-3 may not require the same level of dedicated hardware support. Rather, tenants 120-2 and 120-3 may contract for an SLA wherein access to accelerator bank 108 is based on a given number of bytes per billing cycle. In other words, when a tenant 120 offloads a request to crypto accelerator bank 108, the size in bytes of the payload to be processed is debited against the tenant's SLA for that billing period.

Because the billing model for tenants 120-2 and 120-3 is based not on allocation of a dedicated piece of hardware, but rather on consumption of accelerated resources, the CSP can maintain flexibility in assigning hardware resources to those tenants. For example, at a period of peak traffic, slice 1 110-1 may be allocated to tenant 120-2. When tenant 120-2 is experiencing less traffic demand, and tenant 120-3 is experiencing increased traffic demand, then slice 1 110-1 may instead be allocated to tenant 120-3. Furthermore, there may be times in which both tenant 120-2 and tenant 120-3 both have an average demand, which uses a portion but not all of the capacity of slice 1 110-1. In those cases, tenant 120-2 and tenant 120-3 may simultaneously share slice 1 110-1.

Because these resources are virtualized from the perspective of tenants 120, allocation, de-allocation, and sharing of accelerator resources is transparent to the tenants. Tenants make requests to cryptographic services via an API, receive responses via the API, and process packets accordingly.

Figure 2:
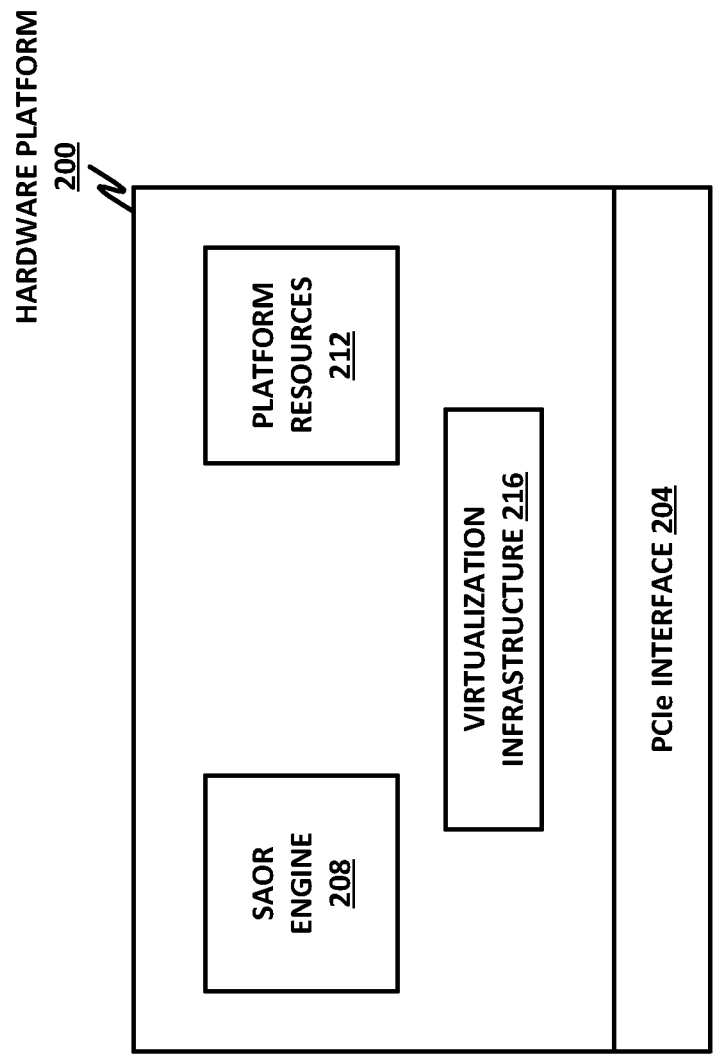
FIG. 2 is a block diagram of a hardware platform, according to one or more examples of the present specification.

FIG. 2 is a block diagram of a hardware platform 200, according to one or more examples of the present specification.

Embodiments of the teachings herein may be provided on a contemporary computing platform, such as a hardware platform provided by Intel® or similar. The hardware platform may be a single computing device (e.g., a dedicated server or appliance with dedicated, onboard processor(s), memory, storage, and peripherals). In other cases, the hardware platform may be more exotic. For example, in a large data center such as may be provided by a CSP, the hardware platform may include rackmount servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a VM via a software abstraction layer, and/or containerization, wherein instances of network functions are provided in "containers" that are separated from one another, but that share an underlying operating system, memory, and/or driver resources.

Intel® has also led the way in new rack scale design (RSD) architectures, wherein data center resources are provided as a full racks, including "sleds" of resources such as power, processors, accelerated memory banks, storage, networking equipment, and accelerators. While these racks may externally conform to the "42 U" (or other) rack standard, internally, they may but need not conform to the rack unit standard. Rather, the sleds may be of suitable sizes and configuration to provide a self-contained cloud environment in a single rack, with individual sleds acting as line-replaceable units (LRUs). RSD is particularly (but not exclusively) suitable for software-defined infrastructure (SDI), wherein a "composite node" may be configured with disaggregated resources such as compute, memory, storage, and accelerators provisioned to the composite node within the same rack or different racks. In this case, the "hardware platform" may include all of the disparate hardware elements (or parts thereof) that are assigned and aggregated into the composite node.

Hardware platform 200 includes platform resources 212, such as memory, storage, processors, or other resources. Hardware platform 200 also includes virtualization infrastructure 216, which provides an infrastructure for hardware platform 200 to provide virtualized computing services. Hardware platform 200 may be, for example, a rackmount server with an appropriate number of processors, such as 24 processors, as well as onboard memory. Hardware platform 200 may access distributed resources, such as fast or persistent memory, additional storage, and accelerators via a PCIe interface 204. PCIe is provided herein as a nonlimiting example of an appropriate interface. It should be understood that any suitable fabric or interface may be used.

Hardware platform 200 also includes SAOR engine 208. As used throughout this specification, an "engine" includes any combination of one or more logic elements that may be hosted on an appropriate hardware platform. The logic elements may be of similar or dissimilar species, operable for and configured to perform one or more methods provided by the engine. For example, an engine may include executable software that is to be executed on any species of processor, such as for example a microprocessor, DSP, coprocessor, or programmable logic device. The software may include one or more tangible, non-transitory computer-readable storage mediums having stored thereon instructions to instruct the processor to provide the method. Such a storage medium could include, by way of nonlimiting example, a hard disk drive, a volatile or nonvolatile memory, a read-only memory (ROM), basic input-output system (BIOS), a flash memory, a CD-ROM, a tape drive, or other memory. A non-transitory medium could also, in appropriate cases, include microcode within a microprocessor, or hardware instructions encoded directly into the semiconductor logic. A storage medium may also include a medium having stored thereon instructions that instruct a device to encode the logic within another device, such as Verilog or VHDL instructions, a mask work, or other logic to cause a device programmer to encode logic on a hardware onto a hardware device. The engine may also be embodied as an intellectual property (IP) block that can be seamlessly integrated into an integrated circuit (IC) as a "black box" with defined inputs, outputs, and functions.

In cases where an engine is embodied in software, the software may be a user space or root-level process that can be launched on any appropriate stimulus. For example, the software may be launched in response to receipt of a signal and/or in response to a user command. In other cases, the software may be a "daemon" process (whether implemented in hardware, software, firmware, or any combination thereof) that initiates at system startup or at another time and runs in the background. The engine may also be a terminate-and-stay-resident program, a service, system extension, control panel, bootup procedure, BIOS subroutine, or any similar program that operates without direct user interaction. In some embodiments, the engine may run with elevated non-root privileges in a "driver space" associated with ring 0, 1, or 2 in a protection ring architecture. It should also be noted that the engine may also include other hardware and software, including configuration files, registry entries, and interactive or user-mode software by way of nonlimiting example.

In cases where the engine is embodied at least partly in hardware other than the system processor, the hardware may include, by way of nonlimiting example, a coprocessor, an FPGA, an ASIC, an IP block, a system-on-a-chip (SoC), GPU, or similar.

Figure 3:
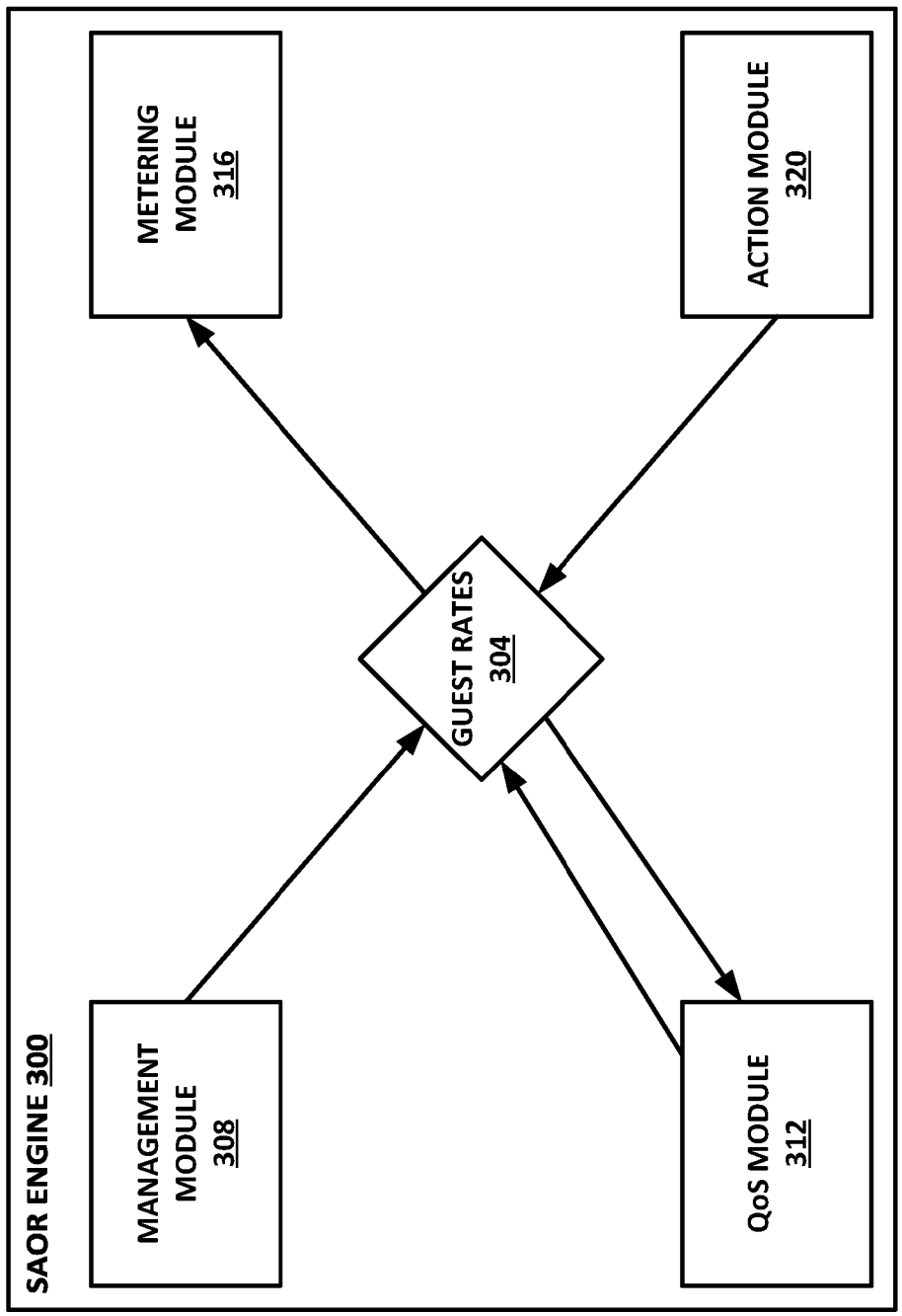
FIG. 3 is a block diagram of a service assurance for oversubscribable resource (SAOR) engine, according to one or more examples of the present specification.

FIG. 3 is a block diagram of a service assurance for oversubscribable resource (SAOR) engine 300, according to one or more examples of the present specification.

Note that as illustrated in FIG. 3, SAOR engine 300 has certain functional blocks. These functional blocks may be embodied in different software modules, hardware modules, different portions of a single hardware or software module, or any other suitable configuration. The allocation of certain functions within functional blocks of SAOR engine 300 is not intended to imply that these functions need to necessarily be embodied in separate hardware or software elements. Rather, it illustrates that these different functions are performed.

In this embodiment, SAOR engine 300 includes a stored data structure including guest rates 304. This may include information about the degree to which certain guests are consuming oversubscribable accelerator resources.

SAOR engine 300 includes a management module 308, a metering module 316, a QoS module 312, and an action module 320. Management module 308 manages the allowed crypto accelerator resources for each tenant and each guest VM. Management module 308 allows for precise slicing of existing crypto accelerator resources and allocation of slices to each guest at runtime. This makes the acceleration resources oversubscribable from the point of view of the CSP. To maximize the performance for tenants who want to own one or more crypto accelerators, SAOR engine 300 also provides dedicated offloading support that achieves one-to-one mapping so that tenants who desire to pay for such dedicated support can achieve zero-copy approaches (for example, DMA buffers to and from guests, directly). This reduces the overhead for those tenants.

Metering module 316 meters the crypto workloads sent by each guest. Metering results may be based on calculated rates made by management module 308. Metering module 316 may support multiple metering schemes.

Action module 320 decides to accept or deny crypto requests sent by the guest, based, for example, on metering results. If the guest has exceeded its allocated requests for the billing cycle, the request may be rejected. Action module 320 may also reject invalid requests for accelerated services.

QoS module 320 may provide runtime checks of the overall throughput and latency, and may provide adjustments to the allowed rates to each guest. SAOR module 300 extends the host's hardware accelerator flexibility to fit the customization requirements of modern multi-tenant cloud infrastructures. To provide this oversubscribable resource, SAOR engine 300 may also ensure that certain conditions are met. For example, a unified crypto virtual interface may be provided to all tenants to access the crypto services provided by the CSP. This decouples the hardware crypto acceleration from software virtual interfaces. All requests sent to the host via the virtual interface may also be identified with the sender tenant and authenticated as qualified requests based on an agreed pricing plan and other factors, which may be enforced by SAOR engine 300. This provides a customizable crypto request/request distribution model and also supports added-value arbitration with the tenant's metadata information.

Note that some of these conditions can be met with the adoption of a virtio or virtio-crypto specification. Thus, in some embodiments, SAOR engine 300 may be implemented on top of virtio or virtio-crypto, and may not require modules to implement the conditions discussed above. The structure and arrangement of the public cloud and virtio-crypto in which SAOR engine 300 is embodied may be separate from SAOR engine 300. When SAOR engine 300 is implemented within virtio and virtio-crypto, structure and arrangement of resources can be handled outside of SAOR engine 300. Furthermore, the implementation details of cryptographic computation, such as session creation, key exchange, and block cipher encryption need not be part of SAOR engine 300. However, in certain embodiments, these functions can be integrated with SAOR engine 300 to achieve tighter coupling.

In the example illustrated in FIG. 3, SAOR engine 300 may receive two accelerator job rates in relation to a policy. These are the committed job rate (CJR), which is the cloud computing provider's promise to provide, and the peak cryptographic job rate (PJR), which may be achieved once the host has the capacity available. Note that PJR may not be applicable to offloading scenarios, in which a dedicated instance of a resource is allocated to a tenant. SAOR engine 300 may use the length of each cryptographic request, in bytes, as the fundamental unit of metering. Further, SAOR engine 300 may support several metering methods, including meter-by-traffic-rate and meter-by-usage.

Meter-by-traffic-rate. In metering by traffic rate, the guests can have unlimited usage of the cryptographic resource as long as its traffic rate is lower than the PJR. The rate may be higher than the CJR as long as the host has extra capacity. Note that in the case of dedicated offloading, this metering method may be disabled.

Meter-by-traffic-usage. In metering by traffic usage, the traffic rate metering still applies, but the total cryptographic workload within a billing period (e.g., a month) may not exceed the agreed workload amount.

Note that for metering purposes, SAOR engine 300 is provided with a metering module that may include a Two Rate Three Color Marker (TrTCM) method. TrTCM may be used, for example, in a differentiated service (Diffserv) traffic conditioner. TrTCM meters an IP packet stream and marks its packets based on two rates, peak information rate (PIR) and committed information rate (CIR), and their associated burst sizes to be one of green, yellow, or red. A packet is marked red if it exceeds the PIR. Otherwise, it is marked either yellow or green, depending on whether it exceeds or doesn't exceed the CIR. Embodiments of the SAOR engine of the present specification may use a TrTCM method, with the PJR acting in place of the PIR, and the CJR acting in place of the CIR.

As service assurance for oversubscribable cryptographic resource in multi-tenant cloud (SA-OCR) targets metering of the virtual cryptography requests for each guest, various coefficients may be introduced to adjust the metering results.

For example, the capacity of the physical cryptographic hardware in the host may be a factor. Apart from the maximum throughput, the cryptographic hardware may have different capacity to process different lengths of requests due to varied factors like PCIe bus usage and hardware "kick" cost. A coefficient $\Delta s$ that multiplies the size of the request may be introduced to compensate for this capacity difference.

The SAOR engine may also be configured to handle invalid cryptographic requests. Ideally, every user would submit only valid crypto requests to the host. But in reality, invalid requests will be received. The SAOR engine may in some embodiments be configured to not provide legitimacy checking for each request. Because invalid requests are not by the cryptographic hardware, they should not be metered. However, a punishment coefficient Δe may be billed to the subscriber for cycles used checking for validity against invalid requests. Note that this may apply specifically to the meter-by-usage metering method.

Figure 4:
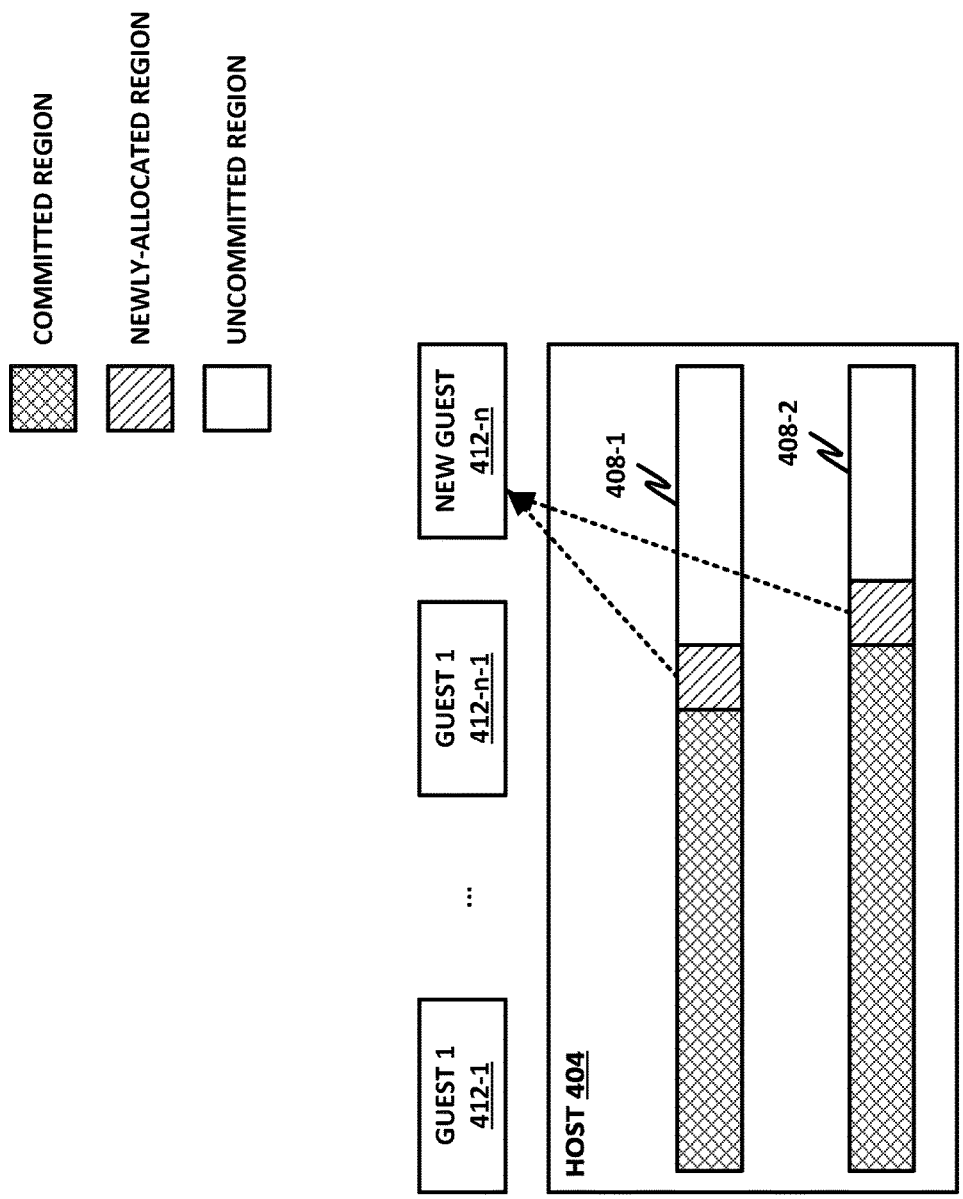
FIG. 4 is a block diagram illustrating resource allocation, according to one or more examples of the present specification.
Figure 5:
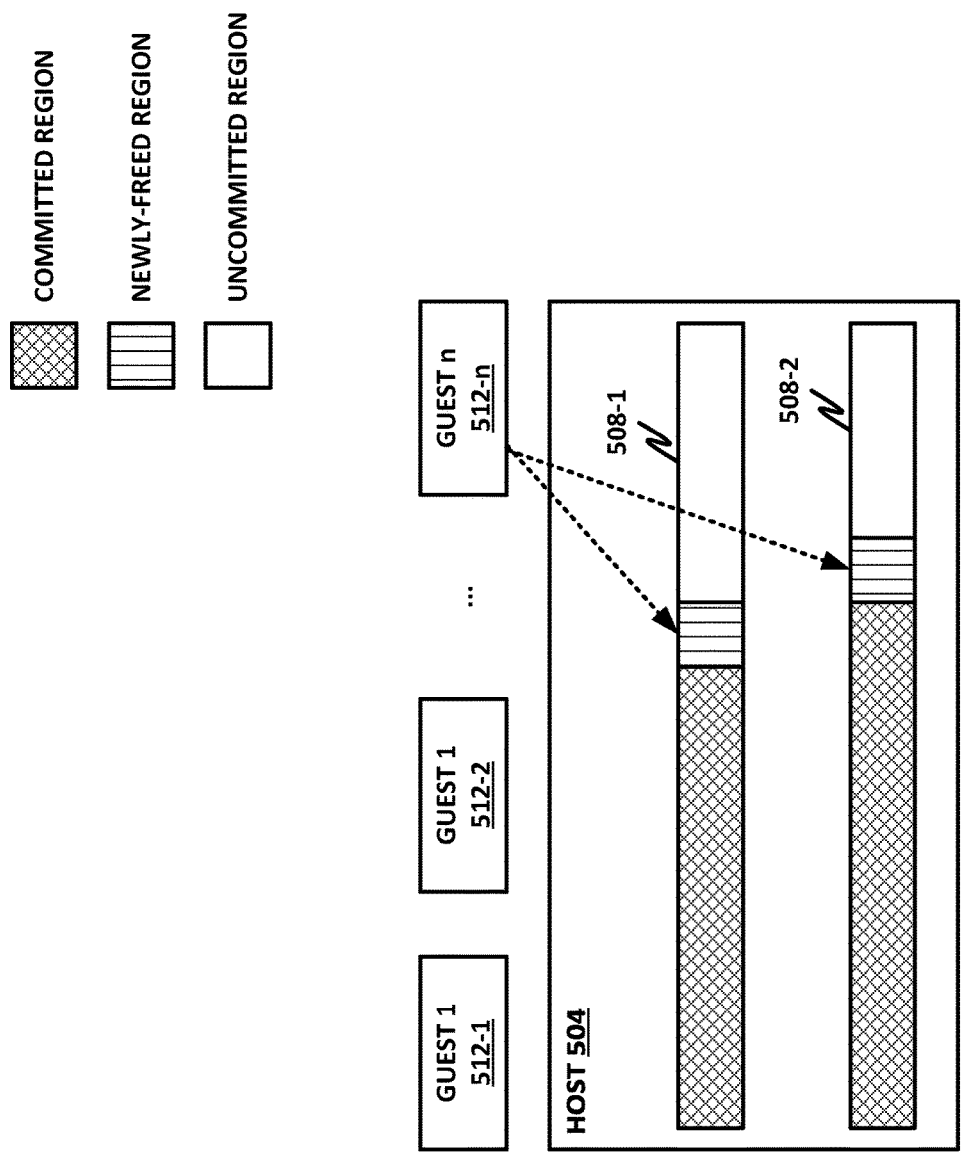
FIG. 5 is a block diagram illustrating resource de-allocation, according to one or more examples of the present specification.

FIGS. 4 and 5 illustrate an example workflow for the allocation and de-allocation of an oversubscribable resource.

As illustrated in FIG. 4, guests 412-1 through 412-n–1 may be provisioned. New guest 412-n is then provisioned. Guest 412-n may request an instance of an oversubscribable resource 408 provided by host 404. As illustrated in FIG. 4, host 404 includes or has access to a plurality of instances of the oversubscribable resource, such as instance 408-1 and instance 408-2. A certain portion of each instance may already be committed, as illustrated by the committed region. Within the illustrated uncommitted region, host 404 may newly allocate a region to new guest 412-n. Note that this newly allocated region need not be found contiguously on instance 408-1.

When new guest 412-n sends a request for allocation to host 404, the request may include the agreed CJR and PJR with the CSP in relation to the oversubscribable service or resource for this subscription/billing plan and period.

Host 404 may check the request against its available physical resources (instances 408-1 and 408-2) to determine whether to grant the request. Once the request is granted, host 404 may register the guest with the service. Note that this may be used with any suitable pricing plan, as it relates to the detailed business model of the CSP.

Termination is illustrated in FIG. 5. In this case, guest n 512-n has allocated to it a noncontiguous region spanning instances 508-1 and 508-2. When guest n 512-n requests termination of the oversubscribable service from host 504, host 504 may free the allocated regions of instances of its oversubscribable service. In the illustrated embodiment, this may occur voluntarily or passively. For example, host 504 may keep track of the status and subscription validity of each guest. Once the subscription reaches its endpoint, otherwise times out, or is terminated, the host may free up newly freed regions of instances 508-1 and 508-2. Note that, upon termination, the host updates the existing guests' policies.

Later guests 512 that request updates of the current service subscription from the host 504 will have available to them the newly freed region of instances 508-1 and 508-2. When host 504 receives a new request, host 504 will determine whether the updated request can be granted.

Figure 6:
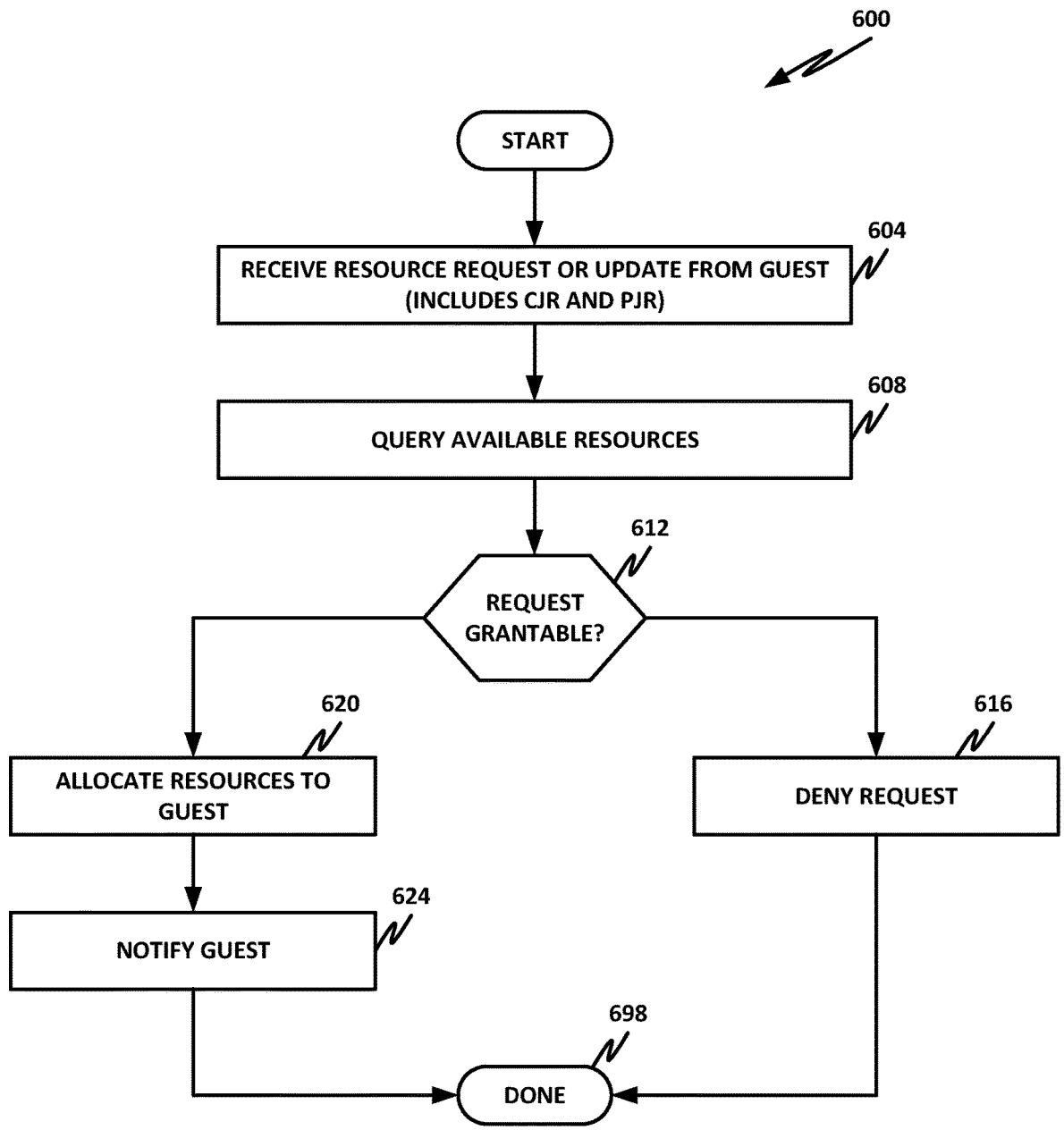
FIG. 6 is a flowchart of a method of allocating resources, according to one or more examples of the present specification.

FIG. 6 is a flowchart of a method 600 of allocating resources, according to one or more examples of the present specification.

Starting in block 604, the host receives a resource request or update request from a guest. This request may include both the CJR and PJR within the request.

In block 608, the host queries its available resources. This may include determining whether the request is valid, and whether the host has instances of its oversubscribable resource available to service the request.

In decision block 612, the host determines whether the request is grantable. If the request is not grantable, then in block 616, the host denies the request, and in block 698, the method is done.

Returning to block 612, if the request is grantable, then in block 620, the host allocates resources to the guest. This may include assigning one or more slices of an oversubscribable resource to the guest. Once the request has been confirmed valid, the length of the request may be adjusted with coefficient Δs, as described above.

In block 624, the host notifies the guest that it now has access to the oversubscribable accelerated resource. After the guest is notified, the host may proceed with QoS scheduling.

QoS scheduling may include metering and scheduling. In the SAOR engine of the present specification, the capacity of the host's physical crypto processing capability is $\xi_c$, which represents the maximum number of bytes the host can process in a crypto workload.

In block 698, the method is done.

After the guest has been granted access to the crypto service, the guest may begin sending crypto job requests to the host via an interface such as PCIe. The requests are accessible and recognizable by the host.

Figure 7:
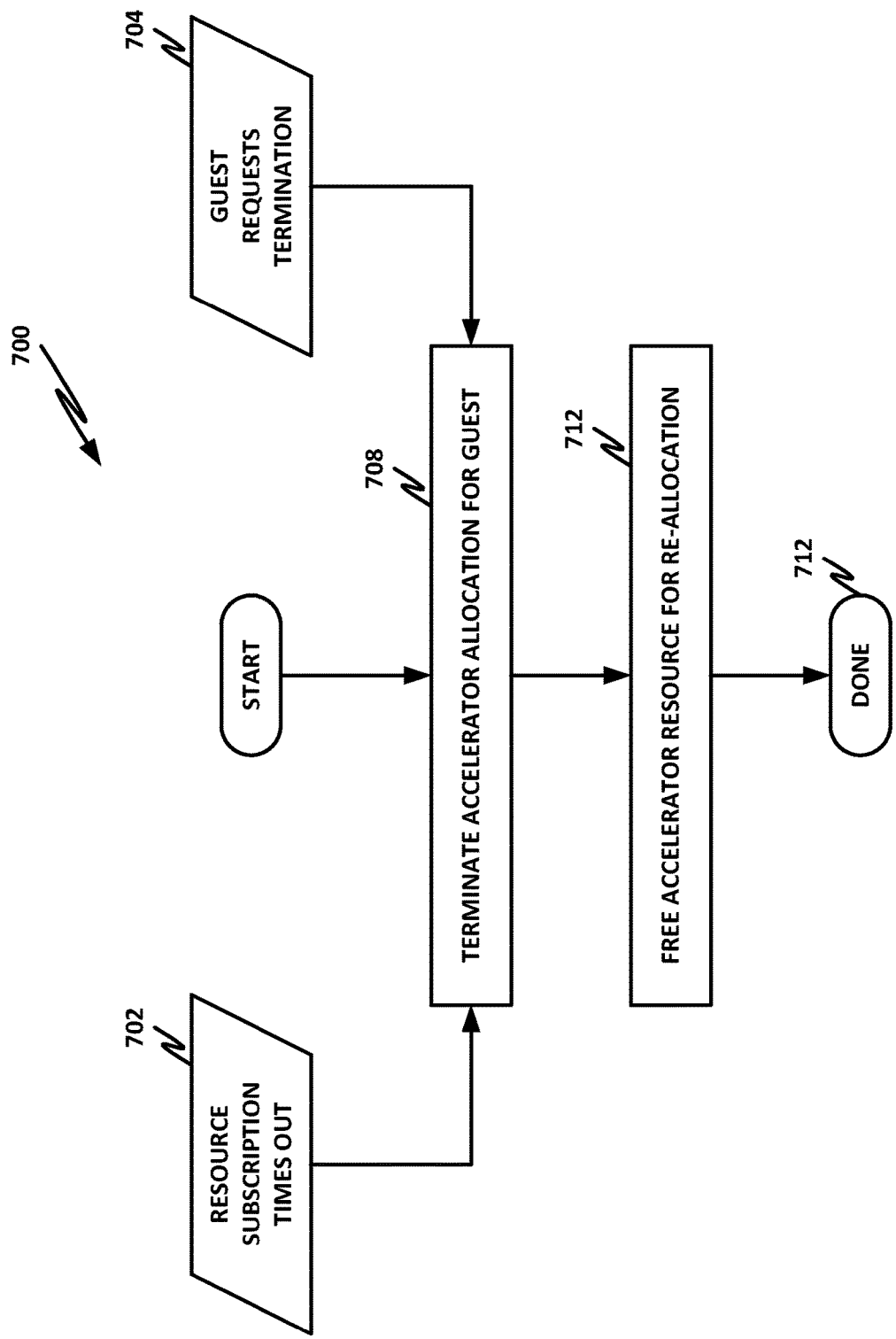
FIG. 7 is a flowchart of a method of de-allocating resources, according to one or more examples of the present specification.

FIG. 7 is a flowchart of a method 700 of de-allocating resources, according to one or more examples of the present specification. Note that in the embodiment of FIG. 7, de-allocating resources terminates access to an instance of an oversubscribable accelerator resource.

In block 708, a resource subscription may time out, as in block 702, or the guest may explicitly request termination, as in block 704. In either instance, the SAOR engine of the host may deem this to be a terminate accelerator allocation per guest signal.

In block 712, the host may free the allocated accelerated resources, as illustrated in FIG. 5. In block 712, the method is done.

Figure 8:
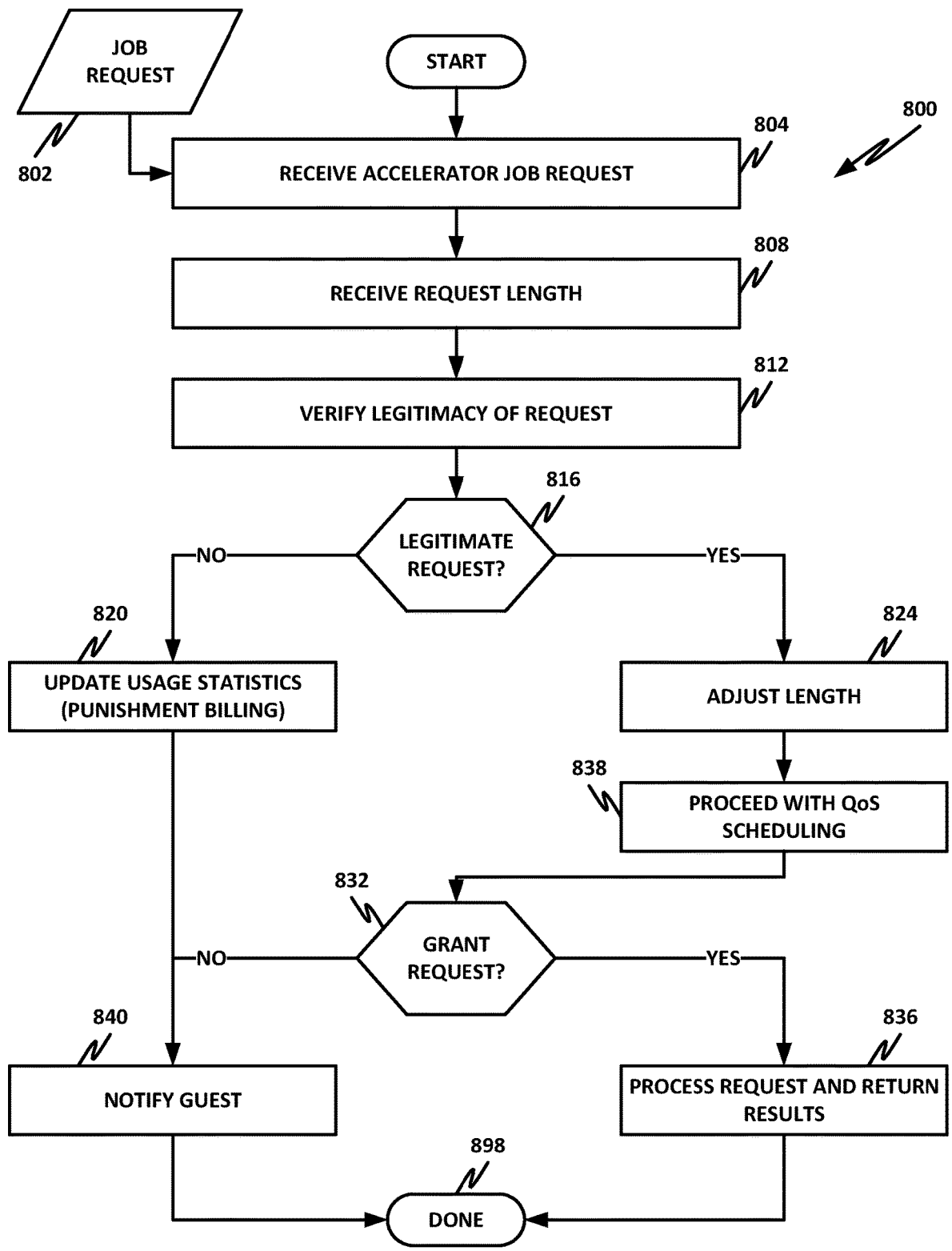
FIG. 8 is a flowchart of a method of handling job requests, according to one or more examples of the present specification.

FIG. 8 is a flowchart of a method 800 of handling job requests, according to one or more examples of the present specification.

Starting in block 804, the host receives an accelerator job request from a guest. This request may include both the CJR and PJR within the request.

In block 808, to service a request, the host may first obtain the length of the request. The request length may be metered either according to traffic rate or usage. If metering according to traffic rate is employed, use of the cryptographic resource is unlimited as long as the traffic rate remains lower than the PJR. If requests are metered according to usage, then use of the cryptographic resource is unrestricted, as long as the total cryptographic workload within a billing period does not exceed an agreed workload amount.

In block 812, the host checks the validity of the request. This may include determining whether the request is of an acceptable length, or whether granting the request would result in exceeding agreed usage parameters.

In decision block 816, if the request fails the check, then the host may or may not update the usage statistics, for example, in reference to punishment billing as discussed above with coefficient Δe. The failed request may be marked with the status of "invalid request" or similar, which may be a guest-recognizable response.

Returning to block 816, if the request is legitimate, then the host may adjust the billed length of the request, according to Δs, as discussed above.

The host may maintain per guest in-flight workload size in bytes $\epsilon i$ ($i \in \{0 \ldots N\}$, where N is the number of guests. The host may then obtain the guest policy thresholds and real-time statistics. These values may be stored in a hash table along with the guest's unique identification (ID), which can be used as a key for lookup.

As described above, the host may also use a technique such as TrTCM to provide color marking. The SAOR engine may use this method to determine whether to process or drop a cryptography job request. Note that Single Rate Three Color Marker (SrTCM) may also be used, and has lower computation overhead, but is less suitable for a "turbo boosting" mode in the SAOR engine. To sign an SLA, it may be desirable to define the CJR with the crypto service subscribers. Once a user has a large number of requests to be processed and the physical hardware in the host has extra capacity, increasing the user's agreed bandwidth temporarily to achieve turbo boosting mode may help both increase the user satisfaction level with the service, and free up tasks in the queue quicker for processing with other threads. Note that in TrTCM, concepts of PIR and CIR, which are associated with PJR and CJR respectively, can be defined. SrTCM does not include a PIR and CIR concept.

After QoS scheduling in block 838, the SAOR engine may determine to either grant the processing request, or drop the job request once it is marked as green or red, respectively. When a job request is marked as yellow, meaning the guest is over CJR but not PJR, an additional check may be carried out. The host may check the available capacity of its cryptography resource by differentiating $\Sigma \varepsilon i$ and $\xi_c$ after adding the job to the queue. If there is capacity left after adding the job, it may be granted to be processed. Otherwise, the host may drop the request.

In decision block 832, if the request is not granted, then in block 840, the host notifies the guest, and in block 898, the method is done.

Returning to decision block 832, after a request is granted to be processed by the host, in block 836 the host may check the total in-flight job quantity. A purpose of the SAOR engine is to allow oversubscription of the host's oversubscribable resources, such as cryptographic and other accelerator resources. It is possible to have a scenario wherein $\Sigma \varepsilon i$ is greater than $\xi_c$. Indeed, this may occur frequently. When this happens, the traffic rate at each guest may be limited. The PJR of each guest should be invalidated and the CJR may be adjusted with the coefficient Δl temporarily, wherein Δl is calculated by averaging the difference between $\Sigma \varepsilon i$ and $\xi_c$ among all guests, plus an adjustment to prevent a similar recurrence soon. The CJR and PJR adjustment may be performed after the request is marked as yellow in TrTCM. The SAOR engine may also determine whether to reverse this adjustment before proceeding with obtaining the length of the next request.

A granted job request is processed by the host cryptography or other accelerator resource, and results in data sent back to the guest.

Note that in cases where dedicated offloading is supported, there is no need for a specific provisioning step, QoS scheduling, and checking whether a request is valid.

In block 898, the method is done.

Figure 9:
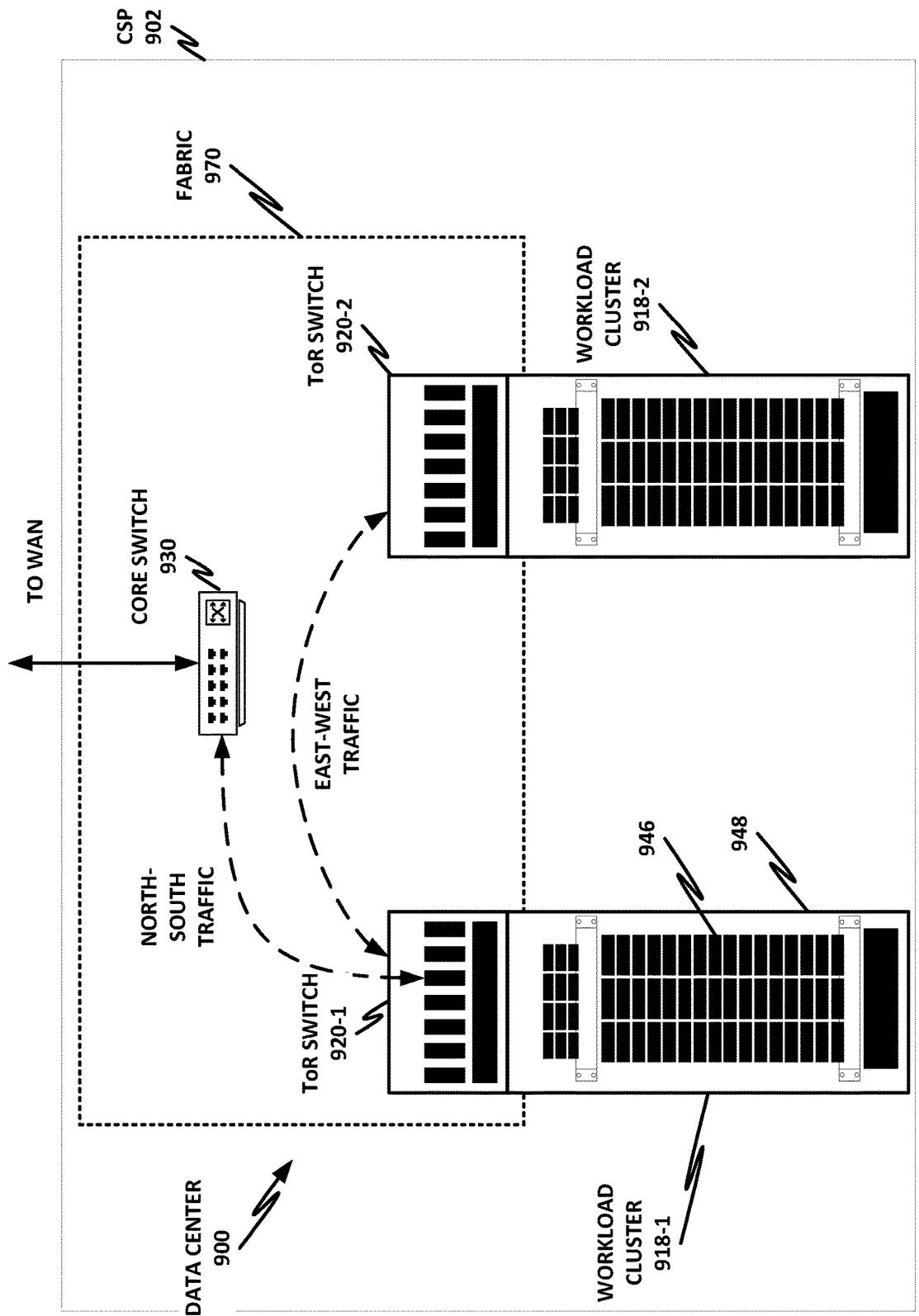
FIG. 9 is a block diagram of selected components of a data center with connectivity to a network of a cloud service provider (CSP), according to one or more examples of the present specification.

FIG. 9 is a block diagram of selected components of a data center with connectivity to network 900 of a CSP 902, according to one or more examples of the present specification. Embodiments of mobile network 900 and CSP 902 disclosed herein may be adapted or configured to provide the method of oversubscribable resource allocation according to the teachings of the present specification.

CSP 902 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 902 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 902 may provision some number of workload clusters 918, which may be clusters of individual servers, blade servers, rackmount servers, or any other suitable server topology. In this illustrative example, two workload clusters, 918-1 and 918-2 are shown, each providing rackmount servers 946 in a chassis 948.

In this illustration, workload clusters 918 are shown as modular workload clusters conforming to the rack unit ("U") standard, in which a standard rack, 19 inches wide, may be built to accommodate 42 units (42 U), each 1.75 inches high and approximately 36 inches deep. In this case, compute resources such as processors, memory, storage, accelerators, and switches may fit into some multiple of rack units from one to 42.

Figure 13:
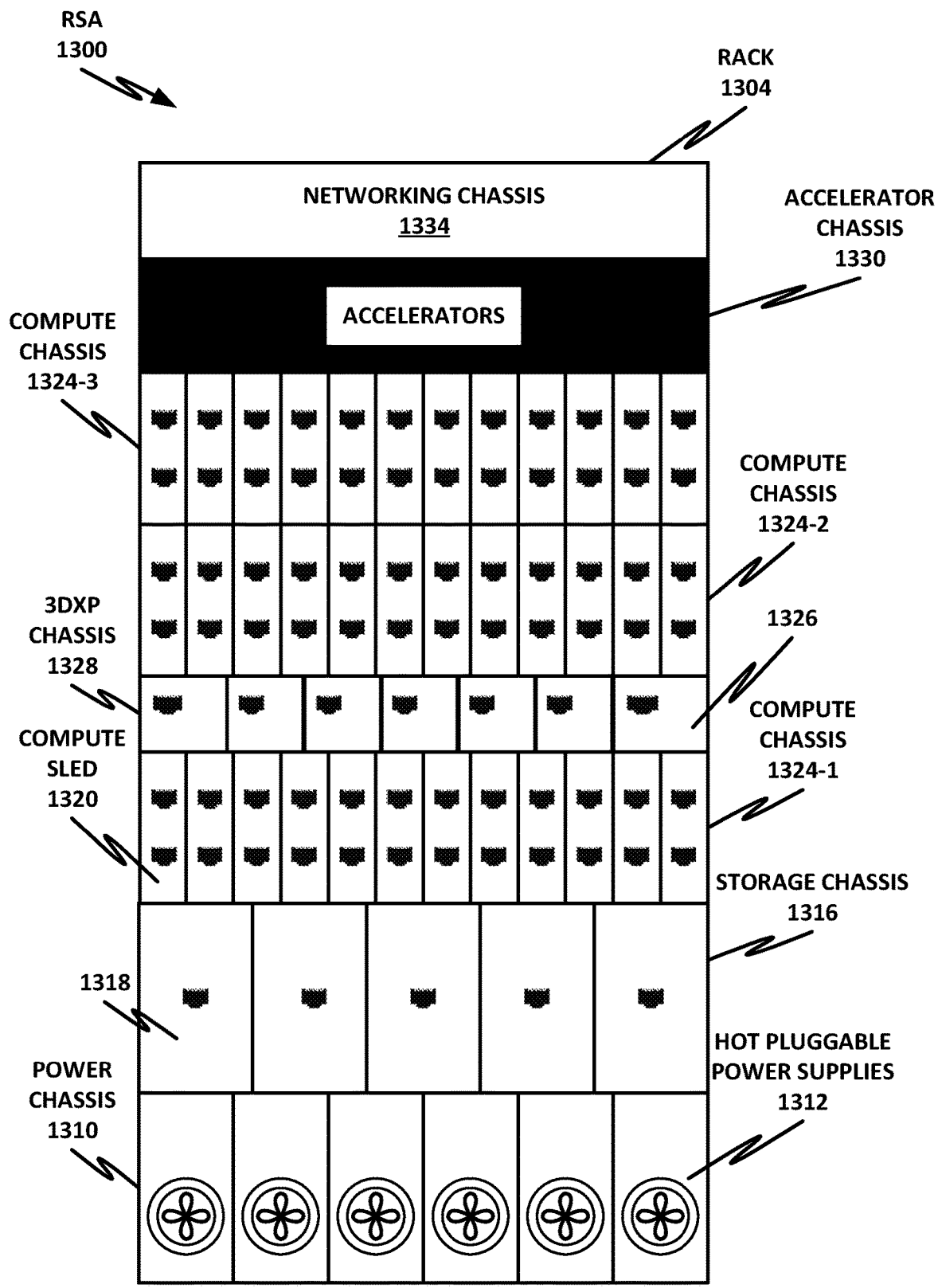
FIG. 13 is a block diagram of a rack scale architecture, according to one or more examples of the present specification.

However, other embodiments are also contemplated. For example, FIG. 13 illustrates a resource sled. While the resource sled may be built according to standard rack units (e.g., a 3 U resource sled), it is not necessary to do so in a so-called "rackscale" architecture. In that case, entire prepopulated racks of resources may be provided as a unit, with the rack hosting a plurality of compute sleds, which may or may not conform to the rack unit standard (particularly in height). In those cases, the compute sleds may be considered LRUs. If a resource fails, the sled hosting that resource can be pulled, and a new sled can be modularly inserted. The failed sled can then be repaired or discarded, depending on the nature of the failure. Rackscale architecture is particularly useful in the case of SDI, wherein composite nodes may be built from disaggregated resources. Large resource pools can be provided, and an SDI orchestrator may allocate them to composite nodes as necessary.

Each server 946 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 946 may be specifically dedicated to certain enterprise clients or tenants, while others may be shared.

The various devices in a data center may be connected to each other via a switching fabric 970, which may include one or more high speed routing and/or switching devices. Switching fabric 970 may provide both "north-south" traffic (e.g., traffic to and from the wide area network (WAN), such as the Internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 946 increases, traffic volume may further increase. For example, each server 946 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 970 may be provided. Switching fabric 970 is illustrated in this example as a "flat" network, wherein each server 946 may have a direct connection to a top-of-rack (ToR) switch 920 (e.g., a "star"

configuration), and each ToR switch 920 may couple to a core switch 930. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 946 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 970. In other embodiments, the Ultra Path Interconnect (UPI) (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 920, and optical cabling provides relatively longer connections to core switch 930. Interconnect technologies that may be found in the data center include, by way of nonlimiting example, Intel® Omni-Path™ Architecture (OPA), TrueScale™, UPI (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in HPC applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 970 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies may arise to supplement or replace some of those listed here, and any such future network topologies and technologies can be or form a part of fabric 970.

In certain embodiments, fabric 970 may provide communication services on various "layers," as originally outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 10:
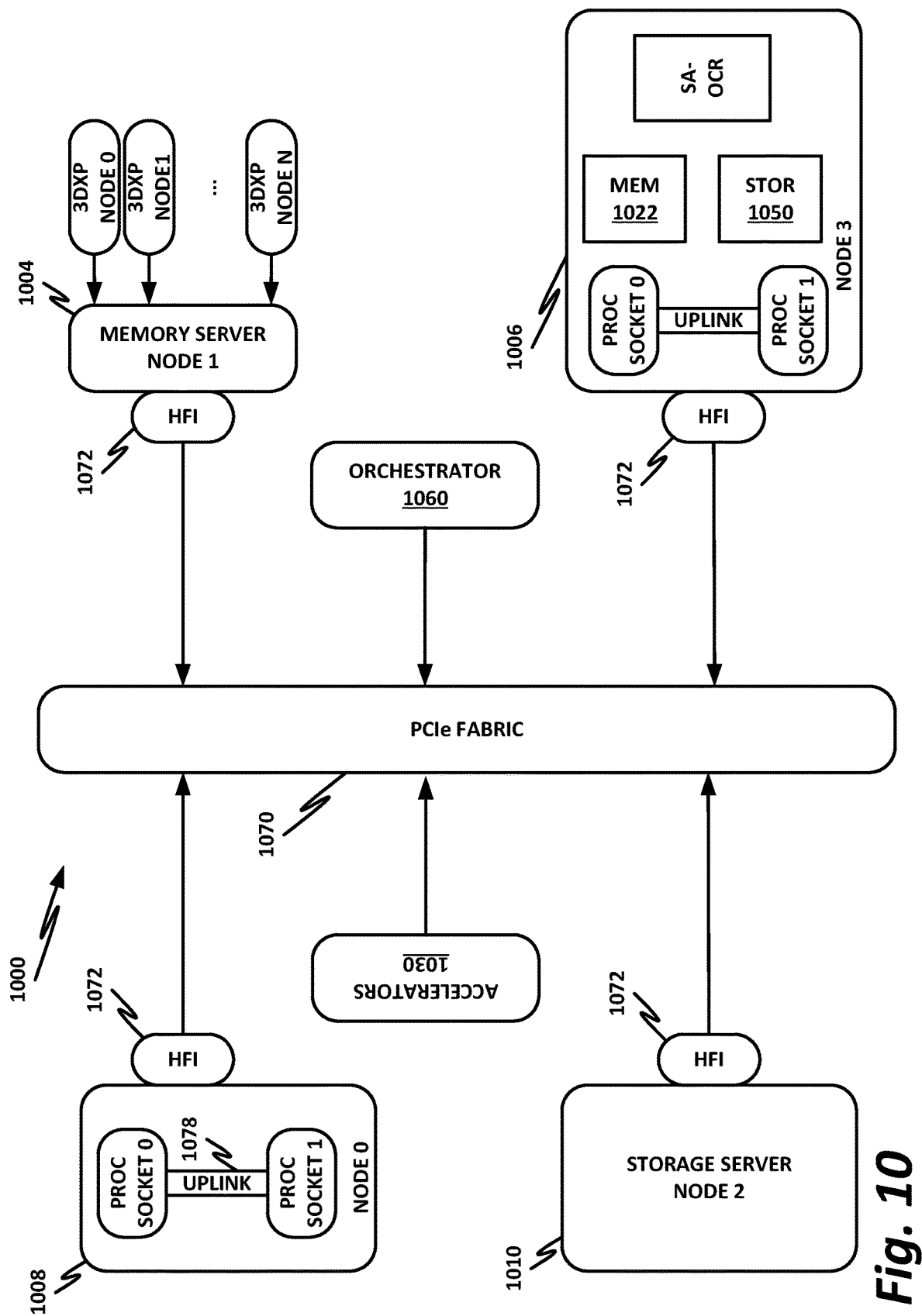
FIG. 10 is a block diagram of selected components of an end user computing device, according to one or more examples of the present specification.

FIG. 10 is a block diagram of an end user computing device 1000, according to one or more examples of the present specification. Embodiments of end user computing device 1000 disclosed herein may be adapted or configured to provide the method of oversubscribable resource allocation according to the teachings of the present specification.

As above, computing device 1000 may provide, as appropriate, cloud service, HPC, telecommunication services, enterprise data center services, or any other compute services that benefit from a computing device 1000.

In this example, a fabric 1070 is provided to interconnect various aspects of computing device 1000. Fabric 1070 may be the same as fabric 970 of FIG. 9, or may be a different fabric. As above, fabric 1070 may be provided by any suitable interconnect technology. In this example, Intel® Omni-Path™ is used as an illustrative and nonlimiting example.

As illustrated, computing device 1000 includes a number of logic elements forming a plurality of nodes. It should be understood that each node may be provided by a physical server, a group of servers, or other hardware. Each server may be running one or more VMs as appropriate to its application.

Node 0 1008 is a processing node including a processor socket 0 and processor socket 1. The processors may be, for example, Intel® Xeon™ processors with a plurality of cores, such as 4 or 8 cores. Node 0 1008 may be configured to provide network or workload functions, such as by hosting a plurality of VMs or virtual appliances.

Onboard communication between processor socket 0 and processor socket 1 may be provided by an onboard uplink 1078. This may provide a very high speed, short-length interconnect between the two processor sockets, so that VMs running on node 0 1008 can communicate with one another at very high speeds. To facilitate this communication, a virtual switch (vSwitch) may be provisioned on node 0 1008, which may be considered to be part of fabric 1070.

Node 0 1008 connects to fabric 1070 via an HFI 1072. HFI 1072 may connect to an Intel® Omni-Path™ fabric. In some examples, communication with fabric 1070 may be tunneled, such as by providing UPI tunneling over Omni-Path™.

Because computing device 1000 may provide many functions in a distributed fashion that in previous generations were provided onboard, a highly capable HFI 1072 may be provided. HFI 1072 may operate at speeds of multiple gigabits per second, and in some cases may be tightly coupled with node 0 1008. For example, in some embodiments, the logic for HFI 1072 is integrated directly with the processors on an SoC. This provides very high speed communication between HFI 1072 and the processor sockets, without the need for intermediary bus devices, which may introduce additional latency into the fabric. However, this is not to imply that embodiments where HFI 1072 is provided over a traditional bus are to be excluded. Rather, it is expressly anticipated that in some examples, HFI 1072 may be provided on a bus, such as a PCIe bus, which is a serialized version of PCI that provides higher speeds than traditional PCI. Throughout computing device 1000, various nodes may provide different types of HFIs 1072, such as onboard HFIs and plug-in HFIs. It should also be noted that certain blocks in an SoC may be provided as IP blocks that can be "dropped" into an integrated circuit as a modular unit. Thus, HFI 1072 may in some cases be derived from such an IP block.

Note that in "the network is the device" fashion, node 0 1008 may provide limited or no onboard memory or storage. Rather, node 0 1008 may rely primarily on distributed services, such as a memory server and a networked storage server. Onboard, node 0 1008 may provide only sufficient memory and storage to bootstrap the device and get it communicating with fabric 1070. This kind of distributed architecture is possible because of the very high speeds of contemporary data centers, and may be advantageous because there is no need to over-provision resources for each node. Rather, a large pool of high speed or specialized memory may be dynamically provisioned between a number of nodes, so that each node has access to a large pool of resources, but those resources do not sit idle when that particular node does not need them.

In this example, a node 1 memory server 1004 and a node 2 storage server 1010 provide the operational memory and storage capabilities of node 0 1008. For example, memory server node 1 1004 may provide remote direct memory access (RDMA), whereby node 0 1008 may access memory resources on node 1 1004 via fabric 1070 in a DMA fashion, similar to how it would access its own onboard memory. The memory provided by memory server 1004 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 1008, a storage server node 2 1010 may be provided. Storage server 1010 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 1008 may access memory from memory server 1004 and store results on storage provided by storage server 1010. Each of these devices couples to fabric 1070 via a HFI 1072, which provides fast communication that makes these technologies possible.

By way of further illustration, node 3 1006 is also depicted. Node 3 1006 also includes a HFI 1072, along with two processor sockets internally connected by an uplink. However, unlike node 0 1008, node 3 1006 includes its own onboard memory 1022 and storage 1050. Thus, node 3 1006 may be configured to perform its functions primarily onboard, and may not be required to rely upon memory server 1004 and storage server 1010. However, in appropriate circumstances, node 3 1006 may supplement its own onboard memory 1022 and storage 1050 with distributed resources similar to node 0 1008.

Computing device 1000 may also include accelerators 1030. These may provide various accelerated functions, including hardware or coprocessor acceleration for functions such as packet processing, encryption, decryption, compression, decompression, network security, or other accelerated functions in the data center. In some examples, accelerators 1030 may include deep learning accelerators that may be directly attached to one or more cores in nodes such as node 0 1008 or node 3 1006. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

In other embodiments, an accelerator could also be provided as an ASIC, FPGA, coprocessor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, ROM, PFM (e.g., Intel® 3D Crosspoint™), external storage, RAID, RAIN, NAS, optical storage, tape drive, backup system, cloud storage, or any combination of the foregoing by way of nonlimiting example. Such a medium could also include instructions programmed into an FPGA, or encoded in hardware on an ASIC or processor.

Figure 11:
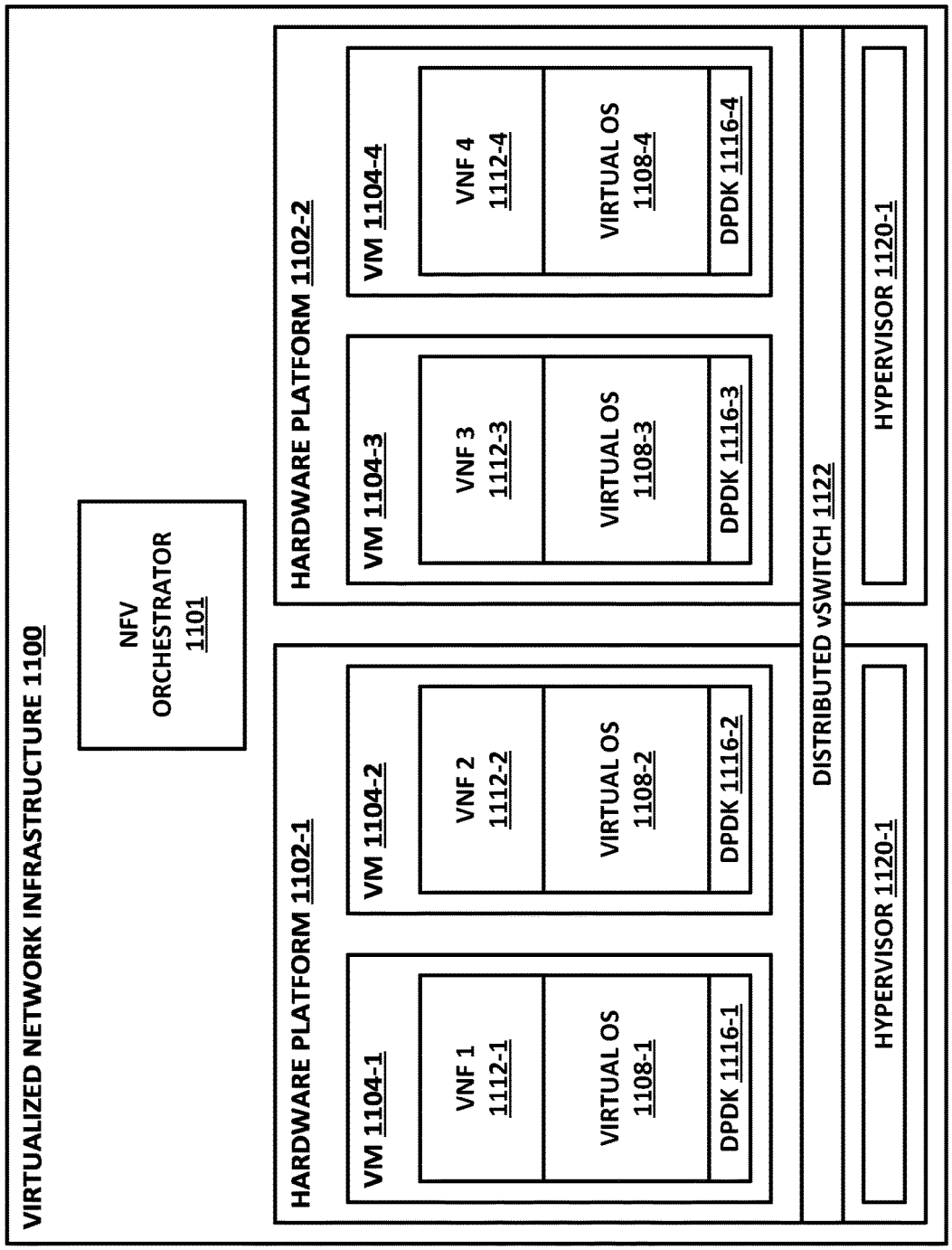
FIG. 11 is a block diagram of a network function virtualization (NFV) architecture, according to one or more examples of the present specification.

FIG. 11 is a block diagram of a network function virtualization (NFV) infrastructure 1100, according to one or more examples of the present specification. Embodiments of NFV infrastructure 1100 disclosed herein may be adapted or configured to provide the method of oversubscribable resource allocation according to the teachings of the present specification.

NFV is an aspect of network virtualization that is generally considered distinct from, but that can still interoperate with software-defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancer VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications services. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. In other words, certain portions of the network may rely on SDN, while other portions (or the same portions) may rely on NFV.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, VMM, or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DVDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This figure does not necessarily illustrate any relationship between the VNFs and the larger network, or the packet flows that NFVI 1100 may employ.

The illustrated Data Plane Development Kit (DPDK) instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
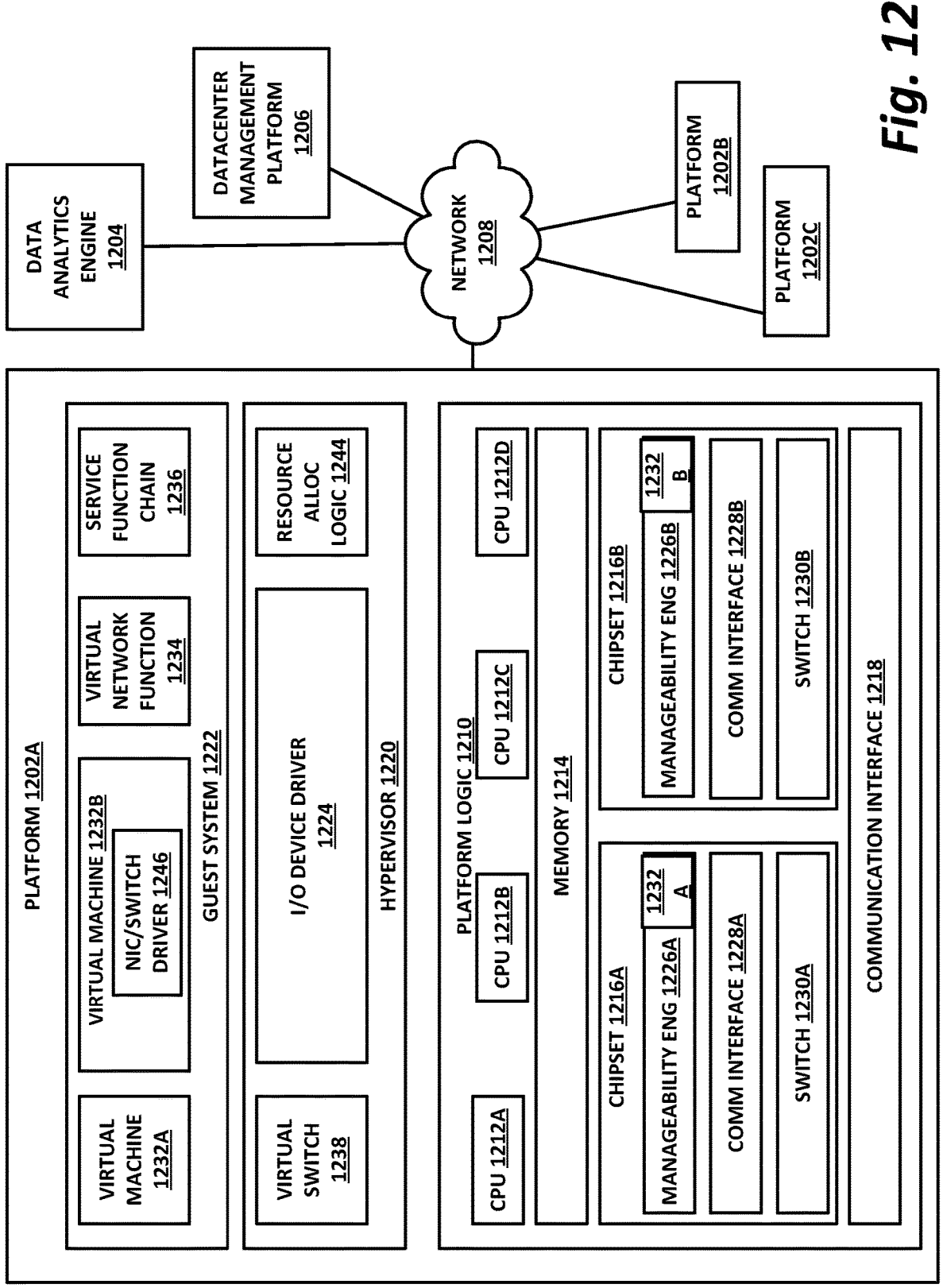
FIG. 12 is a block diagram of components of a computing platform, according to one or more examples of the present specification.

FIG. 12 is a block diagram of components of a computing platform 1202A, according to one or more examples of the present specification. Embodiments of computing platform 1202A disclosed herein may be adapted or configured to provide the method of oversubscribable resource allocation according to the teachings of the present specification.

In the embodiment depicted, platforms 1202A, 1202B, and 1202C, along with a data center management platform 1206 and data analytics engine 1204 are interconnected via network 1208. In other embodiments, a computer system may include any suitable number of (i.e., one or more) platforms. In some embodiments (e.g., when a computer system only includes a single platform), all or a portion of the system management platform 1206 may be included on a platform 1202. A platform 1202 may include platform logic 1210 with one or more CPUs 1212, memories 1214 (which may include any number of different modules), chipsets 1216, communication interfaces 1218, and any other suitable hardware and/or software to execute a hypervisor 1220 or other operating system capable of executing workloads associated with applications running on platform 1202. In some embodiments, a platform 1202 may function as a host platform for one or more guest systems 1222 that invoke these applications. Platform 1202A may represent any suitable computing environment, such as an HPC environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1206, hypervisor 1220, or other operating system) of computer platform 1202A may assign hardware resources of platform logic 1210 to perform workloads in accordance with the stress information. In some embodiments, self-diagnostic capabilities may be combined with the stress monitoring to more accurately determine the health of the hardware resources. Each platform 1202 may include platform logic 1210. Platform logic 1210 comprises, among other logic enabling the functionality of platform 1202, one or more CPUs 1212, memory 1214, one or more chipsets 1216, and communication interfaces 1228. Although three platforms are illustrated, computer platform 1202A may be interconnected with any suitable number of platforms. In various embodiments, a platform 1202 may reside on a circuit board that is installed in a chassis, rack, or other suitable structure that comprises multiple platforms coupled together through network 1208 (which may comprise, e.g., a rack or backplane switch).

CPUs 1212 may each comprise any suitable number of processor cores and supporting logic (e.g., uncores). The cores may be coupled to each other, to memory 1214, to at least one chipset 1216, and/or to a communication interface 1218, through one or more controllers residing on CPU 1212 and/or chipset 1216. In particular embodiments, a CPU 1212 is embodied within a socket that is permanently or removably coupled to platform 1202A. Although four CPUs are shown, a platform 1202 may include any suitable number of CPUs.

Memory 1214 may comprise any form of volatile or nonvolatile memory including, without limitation, magnetic media (e.g., one or more tape drives), optical media, random access memory (RAM), ROM, flash memory, removable media, or any other suitable local or remote memory component or components. Memory 1214 may be used for short, medium, and/or long term storage by platform 1202A. Memory 1214 may store any suitable data or information utilized by platform logic 1210, including software embedded in a computer-readable medium, and/or encoded logic incorporated in hardware or otherwise stored (e.g., firmware). Memory 1214 may store data that is used by cores of CPUs 1212. In some embodiments, memory 1214 may also comprise storage for instructions that may be executed by the cores of CPUs 1212 or other processing elements (e.g., logic resident on chipsets 1216) to provide functionality associated with the manageability engine 1226 or other components of platform logic 1210. A platform 1202 may also include one or more chipsets 1216 comprising any suitable logic to support the operation of the CPUs 1212. In various embodiments, chipset 1216 may reside on the same die or package as a CPU 1212 or on one or more different dies or packages. Each chipset may support any suitable number of CPUs 1212. A chipset 1216 may also include one or more controllers to couple other components of platform logic 1210 (e.g., communication interface 1218 or memory 1214) to one or more CPUs. In the embodiment depicted, each chipset 1216 also includes a manageability engine 1226. Manageability engine 1226 may include any suitable logic to support the operation of chipset 1216. In a particular embodiment, a manageability engine 1226 (which may also be referred to as an innovation engine) is capable of collecting real-time telemetry data from the chipset 1216, the CPU(s) 1212 and/or memory 1214 managed by the chipset 1216, other components of platform logic 1210, and/or various connections between components of platform logic 1210. In various embodiments, the telemetry data collected includes the stress information described herein.

In various embodiments, a manageability engine 1226 operates as an out-of-band asynchronous compute agent which is capable of interfacing with the various elements of platform logic 1210 to collect telemetry data with no or minimal disruption to running processes on CPUs 1212. For example, manageability engine 1226 may comprise a dedicated processing element (e.g., a processor, controller, or other logic) on chipset 1216, which provides the functionality of manageability engine 1226 (e.g., by executing software instructions), thus conserving processing cycles of CPUs 1212 for operations associated with the workloads performed by the platform logic 1210. Moreover the dedicated logic for the manageability engine 1226 may operate asynchronously with respect to the CPUs 1212 and may gather at least some of the telemetry data without increasing the load on the CPUs.

A manageability engine 1226 may process telemetry data it collects (specific examples of the processing of stress information are provided herein). In various embodiments, manageability engine 1226 reports the data it collects and/or the results of its processing to other elements in the computer system, such as one or more hypervisors 1220 or other operating systems and/or system management software (which may run on any suitable logic such as system management platform 1206). In particular embodiments, a critical event such as a core that has accumulated an excessive amount of stress may be reported prior to the normal interval for reporting telemetry data (e.g., a notification may be sent immediately upon detection).

Additionally, manageability engine 1226 may include programmable code configurable to set which CPU(s) 1212 a particular chipset 1216 manages and/or which telemetry data may be collected.

Chipsets 1216 also each include a communication interface 1228. Communication interface 1228 may be used for the communication of signaling and/or data between chipset 1216 and one or more I/O devices, one or more networks 1208, and/or one or more devices coupled to network 1208 (e.g., system management platform 1206). For example, communication interface 1228 may be used to send and receive network traffic such as data packets. In a particular embodiment, a communication interface 1228 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1216 (e.g., manageability engine 1226 or switch 1230) and another device coupled to network 1208. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1228 may allow communication of data (e.g., between the manageability engine 1226 and the data center management platform 1206) associated with management and monitoring functions performed by manageability engine 1226. In various embodiments, manageability engine 1226 may utilize elements (e.g., one or more NICs) of communication interfaces 1228 to report the telemetry data (e.g., to system management platform 1206) in order to reserve usage of NICs of communication interface 1218 for operations associated with workloads performed by platform logic 1210.

Switches 1230 may couple to various ports (e.g., provided by NICs) of communication interface 1228 and may switch data between these ports and various components of chipset 1216 (e.g., one or more peripheral component interconnect express (PCIe) lanes coupled to CPUs 1212). Switches 1230 may be a physical or virtual (i.e., software) switch.

Platform logic 1210 may include an additional communication interface 1218. Similar to communication interfaces 1228, communication interfaces 1218 may be used for the communication of signaling and/or data between platform logic 1210 and one or more networks 1208 and one or more devices coupled to the network 1208. For example, communication interface 1218 may be used to send and receive network traffic such as data packets. In a particular embodiment, communication interfaces 1218 comprise one or more physical NICs. These NICs may enable communication between any suitable element of platform logic 1210 (e.g., CPUs 1212 or memory 1214) and another device coupled to network 1208 (e.g., elements of other platforms or remote computing devices coupled to network 1208 through one or more networks).

Platform logic 1210 may receive and perform any suitable types of workloads. A workload may include any request to utilize one or more resources of platform logic 1210, such as one or more cores or associated logic. For example, a workload may comprise a request to instantiate a software component, such as an I/O device driver 1224 or guest system 1222; a request to process a network packet received from a virtual machine (VM) 1232 or device external to platform 1202A (such as a network node coupled to network 1208); a request to execute a process or thread associated with a guest system 1222, an application running on platform 1202A, a hypervisor 1220 or other operating system running on platform 1202A; or other suitable processing request.

A VM 1232 may emulate a computer system with its own dedicated hardware. A VM 1232 may run a guest operating system on top of the hypervisor 1220. The components of platform logic 1210 (e.g., CPUs 1212, memory 1214, chipset 1216, and communication interface 1218) may be virtualized such that it appears to the guest operating system that the VM 1232 has its own dedicated components.

A VM 1232 may include a virtualized NIC (vNIC), which is used by the VM as its network interface. A vNIC may be assigned a media access control (MAC) address or other identifier, thus allowing multiple VMs 1232 to be individually addressable in a network.

VNF 1234 may comprise a software implementation of a functional building block with defined interfaces and behavior that can be deployed in a virtualized infrastructure. In particular embodiments, a VNF 1234 may include one or more VMs 1232 that collectively provide specific functionalities (e.g., WAN optimization, virtual private network (VPN) termination, firewall operations, load-balancing operations, security functions, etc.). A VNF 1234 running on platform logic 1210 may provide the same functionality as traditional network components implemented through dedicated hardware. For example, a VNF 1234 may include components to perform any suitable NFV workloads, such as virtualized evolved packet core (vEPC) components, mobility management entities, 3rd Generation Partnership Project (3GPP) control and data plane components, etc.

SFC 1236 is a group of VNFs 1234 organized as a chain to perform a series of operations, such as network packet processing operations. Service function chaining may provide the ability to define an ordered list of network services (e.g. firewalls, load balancers) that are stitched together in the network to create a service chain.

A hypervisor 1220 (also known as a VM monitor) may comprise logic to create and run guest systems 1222. The hypervisor 1220 may present guest operating systems run by VMs with a virtual operating platform (i.e., it appears to the VMs that they are running on separate physical nodes when they are actually consolidated onto a single hardware platform) and manage the execution of the guest operating systems by platform logic 1210. Services of hypervisor 1220 may be provided by virtualizing in software or through hardware assisted resources that require minimal software intervention, or both. Multiple instances of a variety of guest operating systems may be managed by the hypervisor 1220. Each platform 1202 may have a separate instantiation of a hypervisor 1220.

Hypervisor 1220 may be a native or bare metal hypervisor that runs directly on platform logic 1210 to control the platform logic and manage the guest operating systems. Alternatively, hypervisor 1220 may be a hosted hypervisor that runs on a host operating system and abstracts the guest operating systems from the host operating system. Hypervisor 1220 may include a virtual switch 1238 that may provide virtual switching and/or routing functions to VMs of guest systems 1222. The virtual switch 1238 may comprise a logical switching fabric that couples the vNICs of the VMs 1232 to each other, thus creating a virtual network through which VMs may communicate with each other.

Virtual switch 1238 may comprise a software element that is executed using components of platform logic 1210. In various embodiments, hypervisor 1220 may be in communication with any suitable entity (e.g., a SDN controller) which may cause hypervisor 1220 to reconfigure the parameters of virtual switch 1238 in response to changing conditions in platform 1202 (e.g., the addition or deletion of VMs 1232 or identification of optimizations that may be made to enhance performance of the platform).

Hypervisor 1220 may also include resource allocation logic 1244, which may include logic for determining allocation of platform resources based on the telemetry data (which may include stress information). Resource allocation logic 1244 may also include logic for communicating with various components of platform logic 1210 entities of platform 1202A to implement such optimization, such as components of platform logic 1210.

Any suitable logic may make one or more of these optimization decisions. For example, system management platform 1206; resource allocation logic 1244 of hypervisor 1220 or other operating system; or other logic of computer platform 1202A may be capable of making such decisions. In various embodiments, the system management platform 1206 may receive telemetry data from and manage workload placement across multiple platforms 1202. The system management platform 1206 may communicate with hypervisors 1220 (e.g., in an out-of-band manner) or other operating systems of the various platforms 1202 to implement workload placements directed by the system management platform.

The elements of platform logic 1210 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

As used in the present specification, cache coherency is a memory architecture that provides uniform sharing and mapping between a plurality of caches. For example, the caches may map to the same address space. If two different caches have cached the same address in the shared address space, a coherency agent provides logic (hardware and/or software) to ensure the compatibility and uniformity of shared resource. For example, if two caches have cached the same address, when the value stored in that address is updated in one cache, the coherency agent ensures that the change is propagated to the other cache. Coherency may be maintained, for example, via "snooping," wherein each cache monitors the address lines of each other cache, and detects updates. Cache coherency may also be maintained via a directory-based system, in which shared data are placed in a shared directory that maintains coherency. Some distributed shared memory architectures may also provide coherency, for example by emulating the foregoing mechanisms.

Coherency may be either "snoopy" or directory-based. In snoopy protocols, coherency may be maintained via write-invalidate, wherein a first cache that snoops a write to the same address in a second cache invalidates its own copy. This forces a read from memory if a program tries to read the value from the first cache. Alternatively, in write-update, a first cache snoops a write to a second cache, and a cache controller (which may include a coherency agent) copies the data out and updates the copy in the first cache.

By way of nonlimiting example, current cache coherency models include MSI (modified, shared, invalid), MESI (modified, exclusive, shared, invalid), MOSI (modified, owned, shared, invalid), MOESI (modified, owned, exclusive, shared, invalid), MERSI (modified, exclusive, read-only or recent, shared, invalid), MESIF (modified, exclusive, shared, invalid, forward), write-once, Synapse, Berkeley, Firefly, and Dragon protocols. Furthermore, ARM processors may use advanced microcontroller bus architecture (AMBA), including AMBA 4 ACE, to provide cache coherency in systems-on-a-chip (SoCs) or elsewhere.

Elements of the computer platform 1202A may be coupled together in any suitable manner such as through one or more networks 1208. A network 1208 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

FIG. 13 is a block diagram of a rack scale architecture 1300 according to one or more examples of the present specification. Embodiments of rack scale architecture 1300 disclosed herein may be adapted or configured to provide the method of oversubscribable resource allocation according to the teachings of the present specification.

In this example, RSA 1300 includes a single rack 1304, to illustrate certain principles of RSD. It should be understood that RSA 1300 may include many such racks, and that the racks need not be identical to one another. In some cases a multipurpose rack such as rack 1304 may be provided, while in other examples, single-purpose racks may be provided. For example, rack 1304 may be considered a highly inclusive rack that includes resources that may be used to allocate a large number of composite nodes. On the other hand, other examples could include a rack dedicated solely to compute sleds, storage sleds, memory sleds, and other resource types, which together can be integrated into composite nodes. Thus, rack 1304 of FIG. 13 should be understood to be a nonlimiting example of a rack that may be used in an RSA 1300.

In the example of FIG. 13, rack 1304 may be a standard rack with an external width of approximately 23.6 inches and a height of 78.74 inches. In common usage, this is referred to as a "42 U rack." However, rack 1304 need not conform to the "rack unit" standard. Rather, rack 1304 may include a number of chassis that are optimized for their purposes.

Rack 1304 may be marketed and sold as a monolithic unit, with a number of LRUs within each chassis. The LRUs in this case may be sleds, and thus can be easily swapped out when a replacement needs to be made.

In this example, rack 1304 includes a power chassis 1310, a storage chassis 1316, three compute chassis (1324-1, 1324-2, and 1324-3), a 3-D Crosspoint™ (3DXP) chassis 1328, an accelerator chassis 1330, and a networking chassis 1334. Each chassis may include one or more LRU sleds holding the appropriate resources. For example, power chassis 1310 includes a number of hot pluggable power supplies 1312, which may provide shared power to rack 1304. In other embodiments, some sled chassis may also include their own power supplies, depending on the needs of the embodiment.

Storage chassis 1316 includes a number of storage sleds 1318. Compute chassis 1324 each contain a number of compute sleds 1320. 3DXP chassis 1328 may include a number of 3DXP sleds 1326, each hosting a 3DXP memory server. And accelerator chassis 1330 may host a number of accelerators, such as Intel® Quick Assist™ technology (QAT), FPGAs, ASICs, or other accelerators of the same or different types. Accelerators within accelerator chassis 1330 may be the same type or of different types according to the needs of a particular embodiment.

Over time, the various LRUs within rack 1304 may become damaged, outdated, or may experience functional errors. As this happens, LRUs may be pulled and replaced with compatible LRUs, thus allowing the rack to continue full scale operation.

Figure 14:
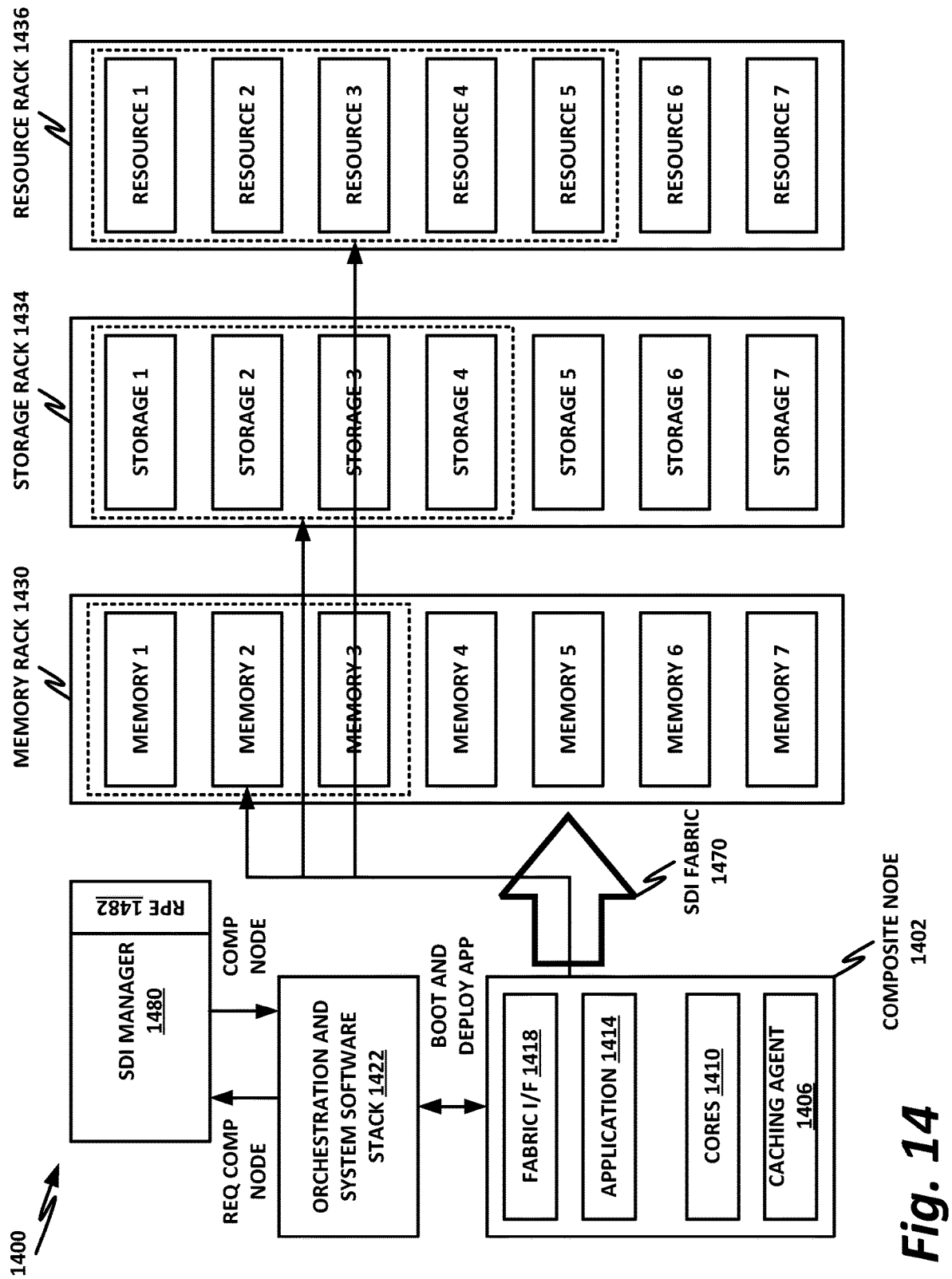
FIG. 14 is a block diagram of a software-defined infrastructure (SDI) data center, according to one or more examples of the present specification.

FIG. 14 is a block diagram of a software-defined infrastructure (SDI) data center 1400, according to one or more examples of the present specification. Embodiments of SDI data center 1400 disclosed herein may be adapted or configured to provide the method of oversubscribable resource allocation according to the teachings of the present specification.

Certain applications hosted within SDI data center 1400 may employ a set of resources to achieve their designated purposes, such as processing database queries, serving web pages, or providing computer intelligence.

Certain applications tend to be sensitive to a particular subset of resources. For example, SAP HANA is an in-memory, column-oriented relational database system. A SAP HANA database may use processors, memory, disk, and fabric, while being most sensitive to memory and processors. In one embodiment, composite node 1402 includes one or more cores 1410 that perform the processing function. Node 1402 may also include caching agents 1406 that provide access to high speed cache. One or more applications 1414 run on node 1402, and communicate with the SDI fabric via HFI 1418. Dynamically provisioning resources to node 1402 may include selecting a set of resources and ensuring that the quantities and qualities provided meet required performance indicators, such as SLAs and QoS. Resource selection and allocation for application 1414 may be performed by a resource manager, which may be implemented within orchestration and system software stack 1422. By way of nonlimiting example, throughout this specification the resource manager may be treated as though it can be implemented separately or by an orchestrator. Note that many different configurations are possible.

In an SDI data center, applications may be executed by a composite node such as node 1402 that is dynamically allocated by SDI manager 1480. Such nodes are referred to as composite nodes because they are not nodes where all of the resources are necessarily collocated. Rather, they may include resources that are distributed in different parts of the data center, dynamically allocated, and virtualized to the specific application 1414.

In this example, memory resources from three memory sleds from memory rack 1430 are allocated to node 1402, storage resources from four storage sleds from storage rack 1434 are allocated, and additional resources from five resource sleds from resource rack 1436 are allocated to application 1414 running on composite node 1402. All of these resources may be associated to a particular compute sled and aggregated to create the composite node. Once the composite node is created, the operating system may be booted in node 1402, and the application may start running using the aggregated resources as if they were physically collocated resources. As described above, HFI 1418 may provide certain interfaces that enable this operation to occur seamlessly with respect to node 1402.

As a general proposition, the more memory and compute resources that are added to a database processor, the better throughput it can achieve. However, this is not necessarily true for the disk or fabric. Adding more disk and fabric bandwidth may not necessarily increase the performance of the SAP HANA database beyond a certain threshold.

SDI data center 1400 may address the scaling of resources by mapping an appropriate amount of offboard resources to the application based on application requirements provided by a user or network administrator or directly by the application itself. This may include allocating resources from various resource racks, such as memory rack 1430, storage rack 1434, and resource rack 1436.

In an example, SDI controller 1480 also includes a resource protection engine (RPE) 1482, which is configured to assign permission for various target resources to disaggregated compute resources (DRCs) that are permitted to access them. In this example, the resources are expected to be enforced by an HFI servicing the target resource.

In certain embodiments, elements of SDI data center 1400 may be adapted or configured to operate with the disaggregated telemetry model of the present specification.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a hardware platform configured to communicatively couple with a multi-tenant cloud service, the multi-tenant cloud service comprising an oversubscribable resource; and a service assurance for oversubscribable resource (SAOR) engine configured to: receive tenant subscriptions to the oversubscribable resource, wherein tenant subscriptions exceed available instances of the oversubscribable resource; receive per-tenant quality of service (QoS) metrics for the oversubscribable resource; receive an allocation request from a guest for allocation of an instance of the oversubscribable resource; compare the request to currently-available instances of the oversubscribable resource; determine that the oversubscribable resource has capacity to service the request according to the QoS metrics of the tenant; and allocate an instance of the oversubscribable resource to the guest.

Example 2 includes the computing apparatus of example 1, wherein the oversubscribable resource is a hardware cryptographic accelerator.

Example 3 includes the computing apparatus of example 1, wherein the SAOR engine is further configured to receive a service request from the guest, and to determine whether to service the service request, comprising applying a Two Rate Three Color Marker algorithm (TrTCM).

Example 4 includes the computing apparatus of example 3, wherein determining that the oversubscribable resource has capacity to service the request comprises determining a committed job rate (CJR) and peak job rate (PJR), and applying the CJR and PJR as a committed information rate (CIR) and peak information rate (PIR) respectively of the TrTCM algorithm.

Example 5 includes the computing apparatus of example 4, wherein determining that the oversubscribable resource has capacity to service the request comprises applying a meter-by-traffic-rate model, wherein the guest is permitted unlimited access to the oversubsribable resource provided the guest's traffic rate is lower than the PJR.

Example 6 includes the computing apparatus of example 5, wherein the guest is permitted access to the oversubsribable resource further provided the guest's traffic rate is lower than the CJR and the host platform has available capacity for the oversubscribable resource.

Example 7 includes the computing apparatus of example 6, wherein the guest is permitted access to the oversubsribable resource further provided the guest's total cryptographic workload within a billing cycle does not exceed an agreed amount.

Example 8 includes the computing apparatus of example 1, wherein determining that the oversubscribable resource has capacity to service the request according to the QoS metrics of the tenant comprises applying a metering factor, wherein the metering factor is based at least partly on a length in bytes of oversubsribable resource usage.

Example 9 includes the computing apparatus of example 1, wherein the SAOR engine is further configured to determine that the request is not valid, and deny the request.

Example 10 includes the computing apparatus of example 1, wherein the SAOR engine is further configured to provide a dedicated offloading mode in which a peak job rate (PJR) metric is ignored.

Example 11 includes the computing apparatus of example 1, wherein the SAOR engine is further configured to determine that the guest's allocation of the oversubscribable resource has timed out, and de-allocate the resource to the guest.

Example 12 includes the computing apparatus of example 1, wherein the SAOR engine is further configured to receive an explicit terminate signal from the guest, and de-allocate the resource to the guest.

Example 13 includes the computing apparatus of example 1, wherein the SAOR engine is further configured to adjust the request's length according to a factor $\Delta s$ to compensate for capacity difference.

Example 14 includes the computing apparatus of example 1, wherein the SAOR engine is further configured to compute a punishment billing factor $\Delta e$ responsive to invalid requests.

Example 15 includes one or more tangible, non-transitory computer-readable storage mediums having stored thereon instructions to provide a service assurance for oversubscribable resource (SAOR) engine configured to: couple to a multi-tenant cloud service, the multi-tenant cloud service comprising an oversubscribable resource; and receive tenant subscriptions to the oversubscribable resource, wherein tenant subscriptions exceed available instances of the oversubscribable resource; receive pertinent quality of service (QoS) metrics for the oversubscribable resource; receive an allocation request from a guest for allocation of an instance of the oversubscribable resource; compare the request to currently-available instances of the oversubscribable resource; determine that the oversubscribable resource has capacity to service the request according to the QoS metrics of the tenant; and allocate an instance of the oversubscribable resource to the guest.

Example 16 includes the one or more tangible, non-transitory computer-readable mediums of example 15, wherein the oversubscribable resource is a hardware cryptographic accelerator.

Example 17 includes the one or more tangible, non-transitory computer-readable mediums of example 15, wherein the SAOR engine is further configured to receive a service request from the guest, and to determine whether to service the service request, comprising applying a Two Rate Three Color Marker algorithm (TrTCM).

Example 18 includes the one or more tangible, non-transitory computer-readable mediums of example 17, wherein determining that the oversubscribable resource has capacity to service the request comprises determining a committed job rate (CJR) and peak job rate (PJR), and applying the CJR and PJR as a committed information rate (CIR) and peak information rate (PIR) respectively of the TrTCM algorithm.

Example 19 includes the one or more tangible, non-transitory computer-readable mediums of example 18, wherein determining that the oversubscribable resource has capacity to service the request comprises applying a meter-by-traffic-rate model, wherein the guest is permitted unlimited access to the oversubsribable resource provided the guest's traffic rate is lower than the PJR.

Example 20 includes the one or more tangible, non-transitory computer-readable mediums of example 19, wherein the guest is permitted access to the oversubsribable resource further provided the guest's traffic rate is lower than the CJR and the host platform has available capacity for the oversubscribable resource.

Example 21 includes the one or more tangible, non-transitory computer-readable mediums of example 20, wherein the guest is permitted access to the oversubsribable resource further provided the guest's total cryptographic workload within a billing cycle does not exceed an agreed amount.

Example 22 includes the one or more tangible, non-transitory computer-readable mediums of example 15, wherein determining that the oversubscribable resource has capacity to service the request according to the QoS metrics of the tenant comprises applying a metering factor, wherein the metering factor is based at least partly on a length in bytes of oversubsribable resource usage.

Example 23 includes the one or more tangible, non-transitory computer-readable mediums of example 15, wherein the SAOR engine is further configured to determine that the request is not valid, and deny the request.

Example 24 includes the one or more tangible, non-transitory computer-readable mediums of example 15, wherein the SAOR engine is further configured to provide a dedicated offloading mode in which a peak job rate (PJR) metric is ignored.

Example 25 includes the one or more tangible, non-transitory computer-readable mediums of example 15, wherein the SAOR engine is further configured to determine that the guest's allocation of the oversubscribable resource has timed out, and de-allocate the resource to the guest.

Example 26 includes the one or more tangible, non-transitory computer-readable mediums of example 15, wherein the SAOR engine is further configured to receive an explicit terminate signal from the guest, and de-allocate the resource to the guest.

Example 27 includes the one or more tangible, non-transitory computer-readable mediums of example 15, wherein the SAOR engine is further configured to adjust the request's length according to a factor $\Delta s$ to compensate for capacity difference.

Example 28 includes the one or more tangible, non-transitory computer-readable mediums of example 15, wherein the SAOR engine is further configured to compute a punishment billing factor $\Delta e$ responsive to invalid requests.

Example 29 includes the one or more tangible, non-transitory computer-readable mediums of any of examples 15-28, wherein the one or more mediums comprise a nonvolatile memory.

Example 30 includes the one or more tangible, non-transitory computer-readable mediums of any of examples 15-28, wherein the one or more mediums comprise a field-programmable gate array.

Example 31 includes the one or more tangible, non-transitory computer-readable mediums of any of examples 15-28, wherein the one or more mediums comprise an application-specific integrated circuit (ASIC).

Example 32 includes the one or more tangible, non-transitory computer-readable mediums of any of examples 15-28, wherein the one or more mediums comprise an intellectual property (IP) block.

Example 33 includes the one or more tangible, non-transitory computer-readable mediums of any of examples 15-28, wherein the one or more mediums comprise a system-on-a-chip (SoC).

Example 34 includes the one or more tangible, non-transitory computer-readable mediums of any of examples 15-28, wherein the one or more mediums comprise processor microcode instructions.

Example 35 includes the one or more tangible, non-transitory computer-readable mediums of any of examples 15-28, wherein the one or more mediums comprise a flash memory.

Example 36 includes a computer-implemented method of providing a service assurance for oversubscribable resource (SAOR) engine, comprising: communicatively coupling to a multi-tenant cloud service, the multi-tenant cloud service comprising an oversubscribable resource; and receiving tenant subscriptions to the oversubscribable resource, wherein tenant subscriptions exceed available instances of the oversubscribable resource; receiving per-tenant quality of service (QoS) metrics for the oversubscribable resource; receiving an allocation request from a guest for allocation of an instance of the oversubscribable resource; comparing the request to currently-available instances of the oversubscribable resource; determining that the oversubscribable resource has capacity to service the request according to the QoS metrics of the tenant; and allocating an instance of the oversubscribable resource to the guest.

Example 37 includes the method of example 36, wherein the oversubscribable resource is a hardware cryptographic accelerator.

Example 38 includes the method of example 36, further comprising receiving a service request from the guest, and determining whether to service the service request, comprising applying a Two Rate Three Color Marker algorithm (TrTCM).

Example 39 includes the method of example 38, wherein determining that the oversubscribable resource has capacity to service the request comprises determining a committed job rate (CJR) and peak job rate (PJR), and applying the CJR and PJR as a committed information rate (CIR) and peak information rate (PIR) respectively of the TrTCM algorithm.

Example 40 includes the method of example 39, wherein determining that the oversubscribable resource has capacity to service the request comprises applying a meter-by-traffic-rate model, wherein the guest is permitted unlimited access to the oversubsribable resource provided the guest's traffic rate is lower than the PJR.

Example 41 includes the method of example 40, wherein the guest is permitted access to the oversubsribable resource further provided the guest's traffic rate is lower than the CJR and the host platform has available capacity for the oversubscribable resource.

Example 42 includes the method of example 41, wherein the guest is permitted access to the oversubsribable resource further provided the guest's total cryptographic workload within a billing cycle does not exceed an agreed amount.

Example 43 includes the method of example 36, wherein determining that the oversubscribable resource has capacity to service the request according to the QoS metrics of the tenant comprises applying a metering factor, wherein the metering factor is based at least partly on a length in bytes of oversubsribable resource usage.

Example 44 includes the method of example 36, further comprising determining that the request is not valid, and deny the request.

Example 45 includes the method of example 36, further comprising providing a dedicated offloading mode in which a peak job rate (PJR) metric is ignored.

Example 46 includes the method of example 36, further comprising determining that the guest's allocation of the oversubscribable resource has timed out, and de-allocate the resource to the guest.

Example 47 includes the method of example 36, further comprising receiving an explicit terminate signal from the guest, and de-allocate the resource to the guest.

Example 48 includes the method of example 36, further comprising adjusting the request's length by a factor $\Delta s$ to compensate for capacity difference.

Example 49 includes the method of example 36, further comprising computing a punishment billing factor $\Delta e$ responsive to invalid requests.

Example 50 includes an apparatus comprising means for performing the method of any of examples 36-49.

Example 51 includes the apparatus of example 50, wherein the means comprise a processor and a memory.

Example 52 includes the apparatus of example 50, wherein the means comprise one or more tangible, non-transitory computer-readable storage mediums having stored thereon executable instructions to provide the SAOR engine.

Example 53 includes the one or more tangible, non-transitory computer-readable mediums of 52, wherein the one or more mediums comprise a nonvolatile memory.

Example 54 includes the one or more tangible, non-transitory computer-readable mediums of 52, wherein the one or more mediums comprise a field-programmable gate array.

Example 55 includes the one or more tangible, non-transitory computer-readable mediums of 52, wherein the one or more mediums comprise an application-specific integrated circuit (ASIC).

Example 56 includes the one or more tangible, non-transitory computer-readable mediums of 52, wherein the one or more mediums comprise an intellectual property (IP) block.

Example 57 includes the one or more tangible, non-transitory computer-readable mediums of 52, wherein the one or more mediums comprise a system-on-a-chip (SoC).

Example 58 includes the one or more tangible, non-transitory computer-readable mediums of 52, wherein the one or more mediums comprise processor microcode instructions.

Example 59 includes the one or more tangible, non-transitory computer-readable mediums of 52, wherein the one or more mediums comprise a flash memory.

What is claimed is:

1. A computing apparatus, comprising:
a hardware platform comprising a processor and a memory, and configured to communicatively couple to a multi-tenant cloud service, the multi-tenant cloud service comprising an oversubscribable resource; and
instructions encoded within the memory to instruct the processor to:
receive tenant subscriptions to the oversubscribable resource, wherein tenant subscriptions exceed available instances of the oversubscribable resource;
receive per-tenant quality of service (QoS) metrics for the oversubscribable resource;
receive an allocation request from a guest for allocation of an instance of the oversubscribable resource for a tenant;
compare the request to currently-available instances of the oversubscribable resource;
determine that the oversubscribable resource has capacity to service the request according to the QoS metrics of the tenant; and
allocate an instance of the oversubscribable resource to the guest.

2. The computing apparatus of claim 1, wherein the oversubscribable resource is a hardware cryptographic accelerator.

3. The computing apparatus of claim 1, wherein the instructions are further to receive a service request from the guest, and to determine whether to service the service request, comprising applying a Two Rate Three Color Marker (TrTCM) algorithm.

4. The computing apparatus of claim 3, wherein determining that the oversubscribable resource has capacity to service the request comprises determining a committed job rate (CJR).

5. The computing apparatus of claim 4, wherein determining that the oversubscribable resource has capacity to service the request further comprises determining a peak job rate (PJR).

6. The computing apparatus of claim 5, wherein determining that the oversubscribable resource has capacity to service the request further comprises applying the CJR and PJR as a committed information rate (CIR) and peak information rate (PIR) respectively of the TrTCM algorithm.

7. The computing apparatus of claim 6, wherein determining that the oversubscribable resource has capacity to service the request comprises applying a meter-by-traffic-rate model, wherein the guest is permitted unlimited access to the oversubscribable resource provided the guest's traffic rate is lower than the PJR.

8. The computing apparatus of claim 7, wherein the guest is permitted access to the oversubscribable resource further provided the guest's traffic rate is lower than the CJR and the hardware platform has available capacity for the oversubscribable resource.

9. The computing apparatus of claim 8, wherein the guest is permitted access to the oversubscribable resource further provided the guest's total cryptographic workload within a billing cycle does not exceed an agreed amount.

10. The computing apparatus of claim 1, wherein determining that the oversubscribable resource has capacity to service the request according to the QoS metrics of the tenant comprises applying a metering factor, wherein the metering factor is based at least partly on a length in bytes of oversubscribable resource usage.

11. The computing apparatus of claim 1, wherein the instructions are further to determine that the request is not valid, and deny the request.

12. The computing apparatus of claim 1, wherein the instructions are further to provide a dedicated offloading mode in which a peak job rate (PJR) metric is ignored.

13. The computing apparatus of claim 1, wherein the instructions are further to to adjust the request's length according to a factor $\Delta s$ to compensate for capacity difference.

14. The computing apparatus of claim 1, wherein the instructions are further to compute a punishment billing factor $\Delta e$ responsive to invalid requests.

15. One or more tangible, non-transitory computer-readable storage mediums having stored thereon instructions to:
couple to a multi-tenant cloud service, the multi-tenant cloud service comprising an oversubscribable resource; and
receive tenant subscriptions to the oversubscribable resource, wherein tenant subscriptions exceed available instances of the oversubscribable resource;
receive per-tenant quality of service (QoS) metrics for the oversubscribable resource;
receive an allocation request from a guest for allocation of an instance of the oversubscribable resource;
compare the request to currently-available instances of the oversubscribable resource;
determine that the oversubscribable resource has capacity to service the request according to the QoS metrics of the guest; and
allocate an instance of the oversubscribable resource to the guest.

16. The one or more tangible, non-transitory computer-readable mediums of claim 15, wherein the one or more mediums comprise an intellectual property (IP) block.

17. A system-on-a-chip comprising the one or more tangible, non-transitory computer-readable mediums of claim 15.

18. The one or more tangible, non-transitory computer-readable mediums of claim 15, wherein the one or more mediums comprise processor microcode instructions.

19. A computer-implemented method of providing service assurance for oversubscribable resources, comprising:
communicatively coupling to a multi-tenant cloud service, the multi-tenant cloud service comprising an oversubscribable resource; and
receiving tenant subscriptions to the oversubscribable resource, wherein tenant subscriptions exceed available instances of the oversubscribable resource;

receiving per-tenant quality of service (QoS) metrics for the oversubscribable resource;
receiving an allocation request from a guest for allocation of an instance of the oversubscribable resource;
comparing the request to currently-available instances of the oversubscribable resource;
determining that the oversubscribable resource has capacity to service the request according to the QoS metrics of the guest; and
allocating an instance of the oversubscribable resource to the guest.

20. The method of claim 19, wherein the oversubscribable resource is a hardware cryptographic accelerator.

* * * * *